United States Patent
Koh et al.

(10) Patent No.: US 10,632,722 B2
(45) Date of Patent: Apr. 28, 2020

(54) COMPOSITE MATERIAL, METHOD OF FORMING THE SAME, AND APPARATUS INCLUDING COMPOSITE MATERIAL

(71) Applicant: Samsung Electronics Co., Ltd., Suwon-si, Gyeonggi-do (KR)

(72) Inventors: Haengdeog Koh, Hwaseong-si (KR); Doyoon Kim, Hwaseong-si (KR); Seyun Kim, Seoul (KR); Jinhong Kim, Seoul (KR); Hajin Kim, Hwaseong-si (KR); Soichiro Mizusaki, Suwon-si (KR); Minjong Bae, Yongin-si (KR); Hiesang Sohn, Seoul (KR); Changsoo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 163 days.

(21) Appl. No.: 15/723,339

(22) Filed: Oct. 3, 2017

(65) Prior Publication Data

US 2018/0099487 A1 Apr. 12, 2018

(30) Foreign Application Priority Data

Oct. 6, 2016 (KR) .................. 10-2016-0129084

(51) Int. Cl.
| | | |
|---|---|---|
| *B32B 17/10* | (2006.01) | |
| *C03C 14/00* | (2006.01) | |
| *C03C 17/00* | (2006.01) | |
| *C03C 3/093* | (2006.01) | |
| *C01G 55/00* | (2006.01) | |
| *C03C 8/02* | (2006.01) | |
| *B82Y 30/00* | (2011.01) | |

(52) U.S. Cl.
CPC ...... *B32B 17/10174* (2013.01); *C01G 55/004* (2013.01); *C03C 3/093* (2013.01); *C03C 8/02* (2013.01); *C03C 14/002* (2013.01); *C03C 14/006* (2013.01); *C03C 17/008* (2013.01); *B32B 17/10944* (2013.01); *B82Y 30/00* (2013.01); *C01P 2002/02* (2013.01); *C01P 2004/03* (2013.01); *C01P 2004/50* (2013.01); *C01P 2004/51* (2013.01); *C01P 2004/62* (2013.01); *C01P 2004/64* (2013.01); *C03C 2214/02* (2013.01); *C03C 2214/16* (2013.01); *C03C 2217/452* (2013.01); *C03C 2217/48* (2013.01)

(58) Field of Classification Search
None
See application file for complete search history.

(56) References Cited

U.S. PATENT DOCUMENTS

| | | | |
|---|---|---|---|
| 5,045,249 A * | 9/1991 | Jin ........................... | H01R 4/04 264/108 |
| 8,133,413 B2 | 3/2012 | Hayakawa et al. | |
| 2007/0018776 A1* | 1/2007 | Tanaka ..................... | C03C 8/20 338/22 R |
| 2015/0295287 A1* | 10/2015 | Schnaars ........... | H01M 10/6571 165/61 |
| 2017/0206997 A1* | 7/2017 | Al-Harthi ................ | H01B 1/04 |

FOREIGN PATENT DOCUMENTS

| | | | |
|---|---|---|---|
| JP | 5831055 B2 | 11/2015 | |
| JP | 5835325 B2 | 11/2015 | |
| KR | 1020120044053 A | 5/2012 | |

OTHER PUBLICATIONS

Park et al. Scientific Reports vol. 5, Article number: 11933 (2015)).*
Definition of Nanomaterial.*
Jagtap et al, "Study of microstructure, impedance and dc electrical properties of RuO2-spinel based screen printed green' NTC thermister", Current Applied Physics, 10, 2010, pp. 1156-1163.

* cited by examiner

Primary Examiner — Robert T Butcher
(74) Attorney, Agent, or Firm — Cantor Colburn LLP

(57) ABSTRACT

A composite material structure including a matrix material layer; and a plurality of one-dimensional nanostructure distributed in the matrix material layer and having an electrical conductivity which is greater than an electrical conductivity of the matrix material layer, wherein the plurality of one-dimensional nanostructures includes a first one-dimensional nanostructure and a second one-dimensional nanostructure in contact with each other.

23 Claims, 17 Drawing Sheets

< Annealing >

< Sintering >

< Colloidal particles >

< After annealing >

NANOSTRUCTURE (N10)

GLASS PARTICLE (Gp10)

< After sintering >

< After sintering >

< COMPARATIVE EXAMPLE >
RuO2 particles in glass

COMPOSITE MATERIAL, METHOD OF FORMING THE SAME, AND APPARATUS INCLUDING COMPOSITE MATERIAL

CROSS-REFERENCE TO RELATED APPLICATION

This application claims priority to and the benefit of Korean Patent Application No. 10-2016-0129084, filed on Oct. 6, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a composite material, a method of forming the composite material, an apparatus including the composite material, and a method of manufacturing the apparatus.

2. Description of the Related Art

Heating elements may be roughly classified into a metallic heating element, a non-metallic (organic) heating element, and other types of heating elements, depending on the type of material used to manufacture the heating element. The metallic heating-element includes a metal such as an alloy in an Fe—Cr—Al family, an alloy in an Ni—Cr family, Pt, Mo, W, Ta, and the like. The non-metallic (organic) heating element includes a carbon-based substance such as graphite, carbon nanotube, carbon black, and the like. The other type of heating element includes ceramic materials such as silicon carbide, molybdenum silicide, and the like.

The metallic heating material and the carbon-based heat emitting material are oxidized by reaction with oxygen at high temperatures. The metal in the metallic heating material forms an oxide by being oxidized, and the carbon in the carbon-based heating material is decomposed/vaporized into CO gas, causing a change in and deterioration of the physical properties of the heating elements. Thus, the metallic heating element and the carbon-based heating element have limitations in their application and use temperatures. The heating elements using the ceramic materials have low electrical conductivity and a high price. Therefore, research and development of materials applicable to heating elements, resistors, and the like are needed.

SUMMARY

Provided is a composite material structure which is applicable to heating elements, resistors, and the like, and a method of manufacturing the structure comprising the composite material.

Provided is a composite material structure which has superior high-temperature durability (oxidation resistance) and controlled (high) electrical conductivity, and methods of manufacturing the structure. Provided also is a structure including a composite material, the structure having excellent heat-emission characteristics, and methods of manufacturing the structure.

Provided is a composite material structure including a composite material that may be manufactured in a relatively simple way and at low cost, and methods of manufacturing the structure.

Provided is a composite material structure that allows for a reduction in the manufacturing cost and facilitates ease of processing, and methods of manufacturing the structure.

Provided are a devices and/or an apparatus including the composite material structure, and a method of manufacturing the device/apparatus.

According to an aspect of an embodiment, a composite material structure includes a matrix material layer including a glass material; and a plurality of one-dimensional nanostructures that are distributed in the matrix material layer and having a higher electrical conductivity than an electrical conductivity of the matrix material layer, wherein the plurality of one-dimensional nanostructures comprises a first one-dimensional nanostructure and a second one-dimensional nanostructure in contact with each other.

The plurality of one-dimensional nanostructures may include a nanowire, a nanorod, or a combination thereof.

The plurality of one-dimensional nanostructures may have an aspect ratio of about 2 or higher.

The plurality of one-dimensional nanostructures may have an aspect ratio of about 4 or higher.

The plurality of one-dimensional nanostructures may have a diameter of about 5 nm to about 500 nm.

The plurality of one-dimensional nanostructures may have a length of about 200 nm to about 20 μm.

At least a portion of the plurality of one-dimensional nanostructures may protrude from a surface of the matrix material layer.

The plurality of one-dimensional nanostructures may include a metal oxide.

The plurality of one-dimensional nanostructures may include $RuO_2$.

The plurality of one-dimensional nanostructures may include a rutile crystalline structure.

The glass material of the matrix material layer may include a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, a sodium oxide, or a combination thereof.

An amount of the plurality of one-dimensional nanostructures in the composite material may be less than or equal to about 20 volume percent (vol %). An amount of the plurality of one-dimensional nanostructures in the composite material may be less than or equal to about 5 vol %. An amount of the plurality of one-dimensional nanostructures may be less than or equal to about 4 vol % or less than or equal to about 2.5 vol %.

The composite material structure may have an electrical conductivity of about 5 Siemens per meter (S/m) or greater at room temperature. The composite material may have an electrical conductivity of about 100 S/m or higher at room temperature. The electrical conductivity of the composite material at the room temperature may be higher than or equal to about 400 S/m or about 2000 S/m.

The composite material structure may be a heating element.

The composite material structure may be a resistor.

According to an aspect of another embodiment, there is provided an apparatus including a heating element, wherein the heating element includes a composite material structure, the composite material including: a matrix material layer including a glass material; and a one-dimensional nanostructure distributed in the matrix material layer and having an electrical conductivity greater than an electrical conductivity of the matrix material layer, wherein the one-dimensional nanostructure comprises a first one-dimensional nanostructure and a second one-dimensional nanostructure in contact with each other.

According to an aspect of another embodiment, there is provided an apparatus including a resistor, wherein the resistor includes the above-described composite material structure.

According to an aspect of another embodiment, there is provided a method of forming a composite material structure, the method including: providing a solution including a plurality of colloidal particles including a metal element; adding a glass powder to the solution to form a solution including the plurality of the colloidal particles and the glass powder; adding a binder to the solution including the plurality of the colloidal particles and the glass powder to form a mixed solution including the plurality of the colloidal particles, the glass powder, and the binder; forming a film by applying the mixed solution containing the plurality of the colloidal particles, the gas powder, and the binder onto a substrate; and forming a plurality of one-dimensional nanostructures from at least a portion of the plurality of the colloidal particles and forming a matrix material layer from the glass powder by performing a thermal treatment process on the film to prepare the composite material structure, wherein the plurality of one-dimensional nanostructures is formed in the matrix material layer.

The thermal treatment process may include annealing the film and sintering the film, wherein in the annealing of the film, the plurality of one-dimensional nanostructures is formed from the colloidal particles on a surface of the glass powder, and wherein in the sintering of the film, the matrix material layer may be formed from the glass powder.

The annealing of the film may be performed at a temperature of about 300° C. to about 500° C.

The sintering of the film may be performed at a temperature of about 500° C. to about 1200° C.

The providing of the solution including the plurality of the colloidal particles including the metal element may include dissolving a metal precursor in an acid solution; and forming the the plurality of the colloidal particles from the metal precursor by adding a basic solution to the acid solution.

The the plurality of the colloidal particles may be amorphous, and the plurality of one-dimensional nanostructures may be crystalline.

The plurality of one-dimensional nanostructures may include a nanowire, a nanorod, or a combination thereof.

The plurality of one-dimensional nanostructures may include a metal oxide.

The plurality of one-dimensional nanostructures may include rutile $RuO_2$.

An amount of the plurality of one-dimensional nanostructures in the composite material may be less than or equal to about 20 vol %. An amount of plurality of one-dimensional nanostructures in the composite material may be less than or equal to about 5 vol %.

The composite material structure may have an electrical conductivity of about 5 S/m or greater at room temperature. The composite material may have an electrical conductivity of about 100 S/m or higher at room temperature.

According to an aspect of another embodiment, a method of manufacturing an apparatus, the method including: forming a heating element and forming an electrode structure electrically connected to the heating element, wherein the forming of the heating element includes forming a composite material structure using the above-described method.

According to an aspect of another embodiment, a method of manufacturing an apparatus, the method including: forming a resistor; and forming an electrode structure electrically connected to the resistor, wherein the forming of the structure includes forming a composite material structure using the above-described method.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
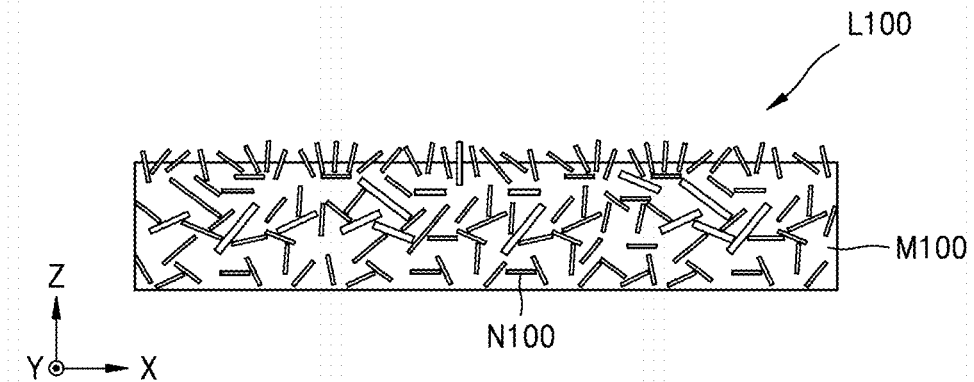
FIG. 1 is a cross-sectional view of a structure of a composite material according to an example embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items. "Or" means "and/or." Expressions such as "at least one of," when preceding a list of elements, modify the entire list of elements and do not modify the individual elements of the list.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, a structures of a composite material, methods of forming the same, an apparatus including the structure of the composite material, and methods of manufacturing the apparatus will be described in detail with reference to the accompanying drawings. The width and thickness of layers or regions illustrated in the accompanying drawings may be exaggerated for clarity of the specification and for convenience of explanation. Throughout the detailed description, identical reference numerals refer to identical elements.

As used herein, the term "nanostructure" refers to a material having a least one dimension (e.g. a diameter or a thickness) which is on a nanoscale level, i.e., a dimension of less than about 1000 nanometers, or about 1 nm to about 1000 nm.

As used herein, the term "nanorod" refers to a material having a rod shape and which has at least one dimension (e.g. a diameter) in a range of less than about 1000 nanometers, or about 1 nm to about 1000 nm, and an aspect ratio of greater than or equal to 2.

As used herein, the term "nanowire" refers to a wire-like material which has a diameter on a nanoscale level, which is not limited by its length, and which has an aspect ratio of about 100 or more.

As used herein, "composite" refers to a material formed by combining two or more materials having different physical and/or chemical properties, wherein the composite has properties different from each material constituting the composite, and wherein particles or wires of each material are at least microscopically separated and distinguishable from each other in a finished structure of the composite.

FIG. 1 is a cross-sectional view of a composite material structure L100 according to an embodiment.

Referring to FIG. 1, the composite material structure L100 may include a matrix material layer M100 and a plurality of nanostructures N100 distributed in the matrix material layer M100. The matrix material layer M100 may have a layer structure extending in parallel to, for example, an XY plane. The matrix material layer M100 may include a glass material. For example, the matrix material layer M100 may be formed of a glass frit or an enamel powder.

The plurality of nanostructures N100 may have an electrical conductivity greater than an electrical conductivity of the matrix material layer M100. At least a portion of the plurality of nanostructures N100 may include a crystalline material. The plurality of nanostructures N100 may be a one-dimensional nanostructure. That is, the plurality of nanostructures N100 may have a nanoscale structure that extends along a single dimension (e.g., one-dimensionally). For example, the plurality of nanostructures N100 may have a form of a nanowire, a nanorod, a form that is similar thereto, or a combination thereof. The plurality of nanostructures N100 may include a material that grows one-dimensionally or relatively one-dimensionally. The plurality of nanostructures N100 may be disposed randomly in the matrix material, rather than in a specific direction or orientation. In other words, the plurality of nanostructures N100 may be disposed in an arbitrary direction. When 70% or more of the plurality of nanostructures N100 is oriented in substantially the same direction, the plurality of nanostructures N100 may be referred to as having a 70% or greater orientation. According to an embodiment, the plurality of nanostructures N100 may have a 50% or less orientation. In this sense, the plurality of nanostructures N100 may be understood as being disposed randomly.

At least a portion of the plurality of nanostructures N100 may contact another portion of the nanostructure. For example, the nanostructure N100 may include a first nanostructure and a second nanostructure that are in contact with each other, as illustrated in FIG. 1. Among the plurality of nanostructures N100, a first nanostructure and a second nanostructure that are adjacent horizontally, vertically, or at an incline to each other may contact each other (FIG. 1). The nanostructures N100 are relatively evenly distributed in the matrix material layer M100 and may be electrically connected to each other. The plurality of nanostructures N100 may be electrically connected from one end to the other end in the horizontal direction of the composite material structure L100. The plurality of nanostructures N100 may form a network structure. Due to the network structure of the nanostructure N100, the composite material structure L100 may have electrical conductivity. The plurality of nanostructures N100 may be regarded as an electrically conductive filler.

The plurality of nanostructures N100 may have an aspect ratio (i.e., a ratio of a length to a width) of about 2 or more. The aspect ratio of the plurality of nanostructures N100 may be greater than or equal to about 2 or greater than or equal to about 4, or greater than or equal to about 10. When compared to the nanoparticle having an aspect ratio of about 2 or less or about 1.5 or less, the nanostructure N100 may have an aspect ratio of greater than about 2 or more or greater than about 4 or more, or greater than about 10 or more, such that the nanostructure N100 may be understood as having a nanowire structure or a structure that is similar thereto. A diameter of the nanostructure N100 may be about 5 nanometer (nm) to about 500 nm, or about 5 nm to about 300 nm, or about 5 nm to about 250 nm, and a length of the nanostructure N100 may be about 200 nm to about 20 micrometers (μm), or about 500 nm to about 20 μm, or about 1 μm to about 20 μm. For example, the diameter of the nanostructure N100 may be about 5 nm to about 200 nm, and the length of the nanostructure N100 may be about 500 nm to about 10 μm. However, not all of the plurality of nanostructures N100 may satisfy the above-described diameter and length conditions. While most of the plurality of nanostructures N100 may satisfy the above-described diameter and length conditions, some of the plurality of nanostructures N100 may not satisfy the diameter and length conditions. For example, a first nanostructure may satisfy the described diameter and length conditions and a second nanostructure may not satisfy the described diameter and length conditions.

The plurality of nanostructures N100 may include a non-carbon-based material. The plurality of nanostructures N100 may include a metallic compound. For example, the plurality of nanostructures N100 may include a metallic oxide. More specifically, the plurality of nanostructures N100 may include ruthenium (Ru) oxide. The Ru oxide may be $RuO_2$. The plurality of nanostructures N100 may have a crystalline structure. For example, if the plurality of nanostructures N100 includes $RuO_2$, the $RuO_2$ may have a rutile crystalline structure. Thus, the plurality of nanostructures N100 may include a rutile $RuO_2$ nanowire. The metallic compound (e.g., metallic oxide) of the plurality of nanostructures N100 may be a ceramic material. Regarding a material of the nanostructure N100, the plurality of nanostructures N100 may have superior electrical conductivity and excellent oxidation resistance. This will be described in detail later.

A portion of the plurality of nanostructures N100 may protrude from a surface of the matrix material layer M100. For example, as illustrated in FIG. 1, a portion of the nanostructure N100 protrudes from a top surface of the matrix material layer M100. A portion of the plurality of nanostructures N100 may protrude from the surface of the matrix material layer M100 by a distance of several nanometers to several micrometers, or several nanometers through several hundreds of nanometers. For example, the nanostructure may protrude from the surface of the matrix layer a distance of from about 5 nm to about 20 μm, or from about 10 nm to about 10 μm, or from about 100 nm to about 5 μm, or from about 100 nm to about 750 nm. Depending on circumstances, a protruding length of some nanostructures N100 may be greater than or equal to several μm, for example, greater than or equal to about 5 μm, or greater than or equal to about 10 μm, or greater than or equal to about 15 μm. The nanostructures N100 protruding from the surface (top surface) of the matrix material layer M100 may extend in a vertical direction rather than in a horizontal direction, or may grow at an incline between the horizontal direction and in the vertical direction. When the plurality of nanostructures N100 protrude from the surface of the matrix material layer M100, electrical conductivity characteristics may be improved due to the protruding nanostructures N100. Although not shown, a portion of the plurality of nanostructures N100 may protrude from a side surface of the matrix material layer M100.

The glass material of the matrix material layer M100 may include, for example, a glass frit material or an enamel material. The glass material may be referred to as a dielectric (or an insulator). To be more specific, the glass material may include a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, a sodium oxide, or a combination thereof. The glass material of the matrix material layer M100 may be a ceramic material. Thus, the composite material structure L100 may be a ceramic structure in which the plurality of nanostructures N100 is distributed. The ceramic structure may also be referred to as a ceramic electroconductor.

In the composite material structure L 100, an amount of the plurality of nanostructures N100 may be less than or equal to about 20 volume percent (vol %). In the composite material structure L100, an amount of the plurality of nanostructures N100 may be less than or equal to about 5 vol %. Herein, an amount of the plurality of nanostructures N100 refers to a volume percent of the plurality of nanostructures N100 with respect to a total volume (100%) of the matrix material layer M100 and the plurality of nanostructures N100. An amount of the plurality of nanostructures N100 may be less than or equal to about 4 vol %, or less than about 2.5 vol %, or may be less than or equal to about 1 vol %, depending on circumstances. As such, in spite of a small amount of the plurality of nanostructures N100, the composite material structure L100 may have relatively high electrical conductivity.

The composite material structure L100 may have an electrical conductivity of about 5 Siemens per meter (S/m) or greater at room temperature (i.e., about 25° C.). The composite material structure L100 may have an electrical conductivity of about 100 S/m or greater at room temperature. Even though an amount (volume) of the plurality of nanostructures N100 is less than or equal to about 1 vol %, the composite material structure L100 may have an electrical conductivity of about 100 S/m or higher (at room temperature). If the amount of the plurality of nanostructures N100 is about 2.5 vol %, the electrical conductivity (at the room temperature) of the composite material structure L100 may be greater than or equal to about 2,000 S/m, and if the amount of the plurality of nanostructures N100 is about 1 vol %, the electrical conductivity (at room temperature) of the composite material structure L100 may be greater than or equal to about 400 S/m. If the amount of the plurality of nanostructures N100 is about 0.5 vol %, the electrical conductivity (at room temperature) of the composite material structure L100 may be greater than or equal to about 140 S/m. As such, in spite of a small amount of the plurality of nanostructures N100, the composite material structure L100 may have relatively high electrical conductivity. In other words, by using a small amount/volume of nanostructures N100, e.g., 5 vol % or less or 1 vol % or less, the composite material structure L100 having high electrical conductivity may be obtained. In this regard, the manufacturing cost of the composite material structure L100 may be reduced. This will be described in detail later.

However, according to circumstances, in the composite material structure L100, the amount of the plurality of nanostructures N100 may be less than about 5 vol %. The electrical conductivity of the composite material structure L100 at room temperature may be less than about 100 S/m. Thus, the amount of the plurality of nanostructures N100 in the composite material structure L100 may be less than or equal to about 20 vol %, and the electrical conductivity (at room temperature) of the composite material structure L100 may be greater than or equal to about 5 S/m. Depending on circumstances (e.g., the desired amount of electrical conductivity), the content of the plurality of nanostructures N100 may be adjusted accordingly, and thus, the electrical conductivity of the composite material structure L100 may also be controlled. As the content of the plurality of nanostructures N100 increases, the electrical conductivity of the composite material structure L100 may also increase.

The composite material structure L100 may have a thickness of about 1 μm or more. The thickness of the composite material structure L100 may be greater than or equal to several μm or several tens of μm, for example, 1 μm to about 100 μm, or about 5 μm to about 75 μm, or about 10 μm to about 50 μm. Thus, the composite material structure L100 may be referred to as a 'thick film'. However, according to circumstances, the thickness of the composite material structure L100 may be less than 1 μm.

The composite material structure L100 may be used as a heating element. For example, the composite material structure L100 may be used as a heating element for a heating device. The composite material structure L100 may be used as a resistor. For example, the composite material structure L100 may be applied as a "thick film resistor" of a semiconductor device. The composite material structure L100 may be used as a sensor layer for a touch sensor, a sensor layer for a gas sensor, or the like. The application field of the composite material structure L100 may change variously. The application field of the composite material structure L100 will be described later in more detail.

Although a portion of the plurality of nanostructures N100 protrudes from the surface of the matrix material layer M100, as illustrated in FIG. 1, it is possible that the nanostructure may not protrude from the surface of the matrix, depending upon the circumstances. For example, the top surface of the composite material structure L100 of FIG. 1 may be polished to remove a protruding portion of the nanostructure N100. In this case, a surface roughness of the top surface of the composite material structure L100 may be reduced.

Figure 2:
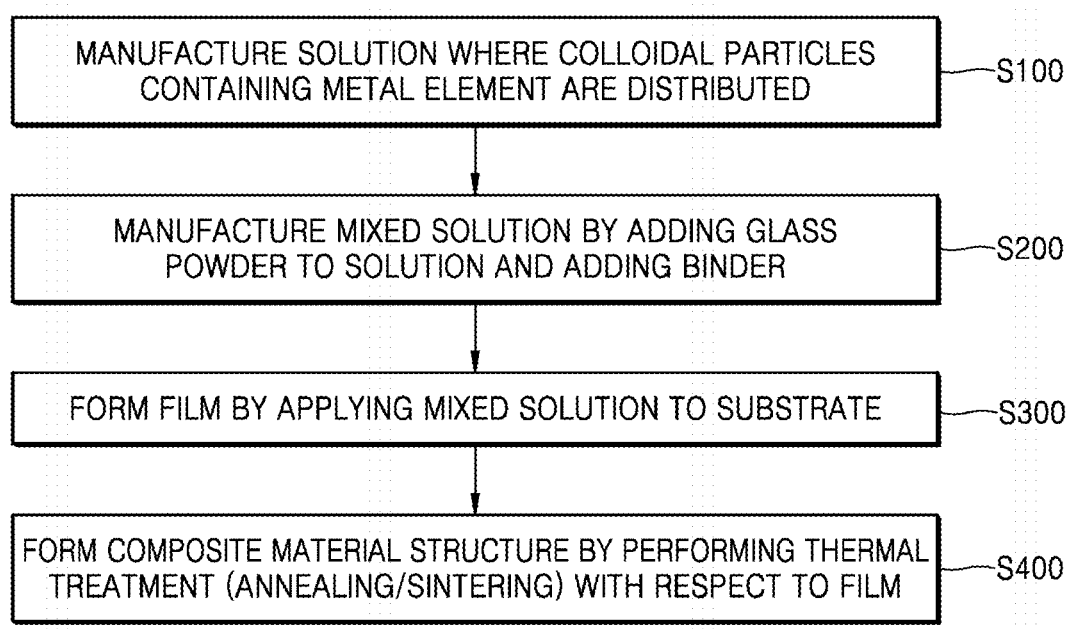
FIG. 2 is a flowchart of a method of forming a structure of a composite material according to an example embodiment.

FIG. 2 is a flowchart of a method of forming a composite material structure according to an embodiment.

Referring to FIG. 2, a solution where a plurality of the colloidal particles containing a metal element (e.g., metallic atoms) are dispersed may be provided in operation S100. The colloidal particles may be referred to herein as precursors.

Glass powder may be then added to the solution, and a binder, etc., may be further added to manufacture a mixed solution in operation S200. The glass powder may include a glass frit or enamel powder. After adding the glass powder to the solution, a mixing process may be performed for several minutes through several hours, for example, from about 5 minutes to about 48 hours, or about 10 minutes to about 36 hours, or about 20 minutes to about 25 hours. The binder may include, for example, a cellulose-based material. After the binder is added, a dispersion process may be performed. An additive such as a dispersing agent, etc. may be further added together with the binder. The mixed solution manufactured as described above may be referred to as a slurry.

The mixed solution (slurry) may be then applied onto a substrate to form a film in operation S300. The operation of applying the mixed solution onto the substrate may be performed by performing any one of spray coating, spin coating, dip coating, screen coating, and inkjet coating.

Next, the composite material structure is formed by performing a thermal treatment process on the film (S400). By performing the thermal treatment process on the film, a plurality of nanostructures (e.g., nanowire) may grow from the plurality of the colloidal particles and a matrix material layer may be formed from the glass powder. The plurality of nanostructures (e.g., nanowires) may be formed in the matrix material layer, and the resulting structure is referred to as the 'composite material structure'. The thermal treatment process may include an operation of annealing the film and an operation of sintering the film. In the operation of annealing the film, the plurality of nanostructures (e.g., nanowires) may be formed from the colloidal particles and on a surface of the glass powder. The operation of annealing the film may be referred to as an operation where the nanostructures (e.g., nanowires) are grown/formed, i.e., a crystal growth operation. The operation of annealing the film may be performed at a temperature of about 300° C. to about 500° C. In the operation of annealing the film, an organic material such as the binder, the dispersing agent, etc., may be removed. The operation of sintering the film may form the matrix material layer from the glass powder. The operation of sintering the film may be performed at a temperature of about 500° C. to about 1,200° C. If a portion of the organic material such as the binder, the dispersing agent, etc., remains in the film after the operation of annealing the film, the remaining organic material may be removed during the operation of sintering the film. As a result, the composite material structure L100 described with reference to FIG. 1 may be formed.

Hereinbelow, a method of forming a composite material structure will be described in more detail with reference to FIGS. 3A through 3J.

FIGS. 3A through 3M illustrate a method of forming a composite material structure according to an exemplary embodiment. FIGS. 3A through 3G are perspective views, and FIGS. 3H through 3M are cross-sectional views. The current embodiment may be an example of the method described with reference to FIG. 2.

Figure 3A:
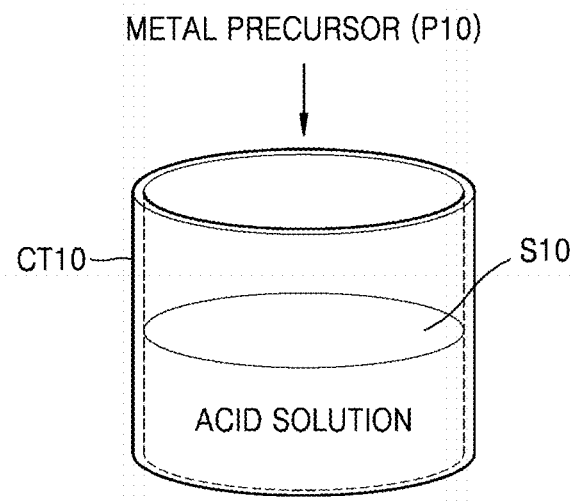
FIGS. 3A through 3M illustrate a method of forming a structure of a composite material according to an example embodiment.

Referring to FIG. 3A, an acid solution S10 may be put into a container CT10, and a metal precursor P10 may be dissolved in the acid solution S10. The acid solution S10 may be, for example, an HCl solution. The HCl solution may be a solution including water and HCl having a concentration of 2 molar (M). The metal precursor P10 may include metal salt. For example, the metal precursor P10 may include $RuCl_3$ as the metal salt. The metal salt may be a hydrate. In this case, the metal salt may be $RuCl_3$-$xH_2O$. A specific material of the metal precursor P10, such as $RuCl_3$ and $RuCl_3$-$xH_2O$ proposed herein is merely an example, and may be changed variously. The metal precursor P10 may be dissolved in the acid solution S10 for several minutes through several hours, for example, from about 5 minutes to about 12 hours, or from about 10 minutes to about 10 hours, or from about 20 minutes to about 5 hours. For example, the metal precursor P10 may be dissolved for about one hour through about five hours.

Figure 3B:
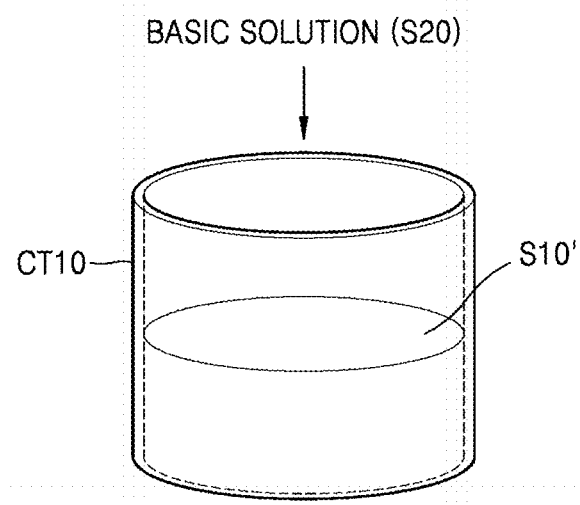

Referring to FIG. 3B, a basic solution S20 may be added to an acid solution S10' in which the metal precursor (P10 of FIG. 3A) is dissolved. The basic solution S20 may be, for example, an NaOH solution. The NaOH solution may be a solution including water and NaOH having a concentration of 1 M. The basic solution S20 may be slowly added to the acid solution S10 ' by using a drop-by-drop scheme, and in this way, pH of the solution S10 ' may be adjusted.

Figure 3C:
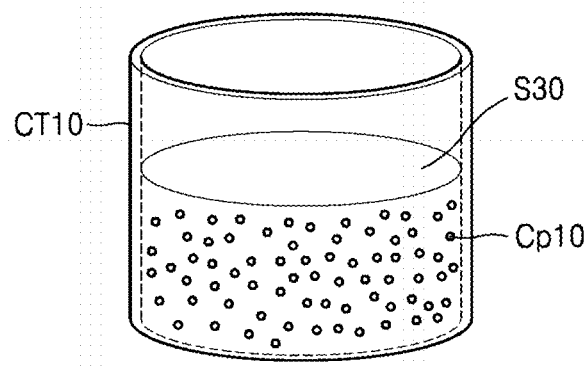

As a result of the process shown in FIG. 3B, colloidal particles Cp10 may be formed as shown in FIG. 3C. Through a reaction between the basic solution S20 (FIG. 3B) and the metal precursor P10 (FIG. 3A) in the acid solution S10' (FIG. 3B), the colloidal particles Cp10 containing a metallic element may be formed. The colloidal particles Cp10 may be, for example, colloidal particles of a metal hydroxide. More specifically, the colloidal particles Cp10 may be ruthenium (Ru) hydroxide, i.e., $Ru(OH)_3$. The colloidal particles Cp10 may be amorphous $Ru(OH)_3$ particles. The diameter of the colloidal particles Cp10 may be for example, about 5 nm to about 200 nm, or about 10 nm to about 150 nm, or about 15 nm to about 120 nm. The colloidal particles Cp10 may be relatively homogeneously distributed in a solution S30. The colloidal particles Cp10 may be referred to as a metal precursor. If the metal precursor P10 of FIG. 3A is a primary precursor, the colloidal particles Cp10 of FIG. 3C may be a secondary precursor. The solution S30 of FIG. 3C indicates a solution where the acid solution S10' (FIG. 3B) and the basic solution S20 (FIG. 3B) are mixed.

In addition, the colloidal particles Cp10 of FIG. 3C may have superior dispersion characteristics and long-term dispersion stability. Thus, additional processing such as surface modification for dispersion may not be needed. A film (L10b of FIG. 3J) having superior homogeneity may be formed later.

Figure 3D:
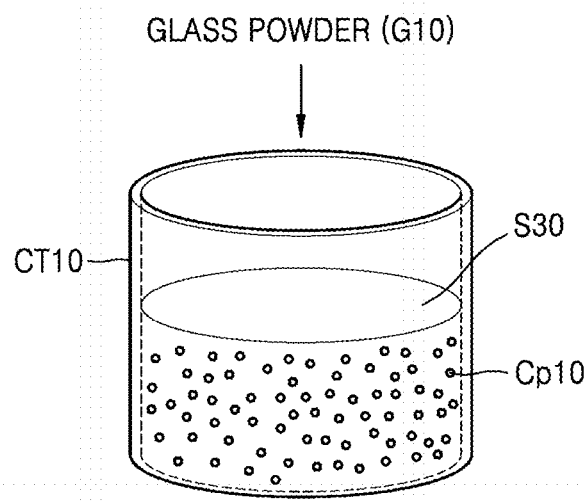

Referring to FIG. 3D, glass powder G 10 may be added to the solution S30. The glass powder G10 may include a glass frit or enamel powder. A mean particle size (particle diameter) of the glass powder G10 may be less than about 25 μm, or less than about 20 μm, or less than about 10 μm. The amount of the glass powder G10 added to the solution S30 may be selected based on the amount of the colloidal particles Cp10 in the solution S30. For example, the added amount of the glass powder G10 may be controlled such that a final volume (vol %) of the colloidal particles Cp10 with respect to a total volume of the colloidal particles Cp 10 and the glass powder G10, is less than or equal to about 20 vol %, less than or equal to about 10 vol %, or less than or equal to about 5 vol %. After adding the glass powder G10 to the solution S30, a mixing process may be performed for several minutes through several hours. For example, the mixing process may be performed for about one hour through about five hours.

Figure 3E:
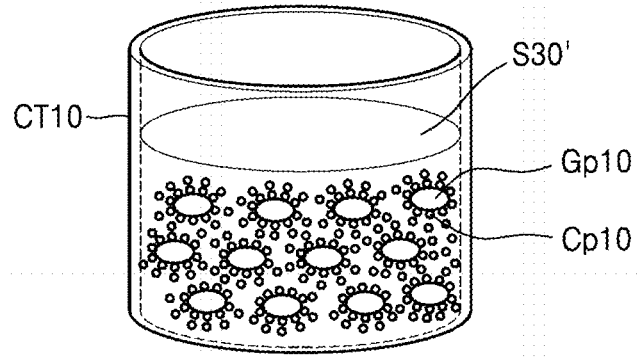

As shown in FIG. 3E, as a result of the process shown in FIG. 3D, the colloidal particles Cp10 may be adsorbed onto the surface of glass particles Gp10 of the glass powder G10 (FIG. 3D). The mean particle size of the glass particles Gp10 may be much greater than the mean particle size of the colloidal particles Cp10, and so the plurality of colloidal particles Cp10 may be adsorbed on the surface of the glass particle Gp10. The surface of the glass particle Gp10 may have hydrophilic properties and the colloidal particles Cp10 may also have hydrophilic properties, such that the colloidal particles Cp10 may have high affinity with respect to the glass particles Gp10. Thus, the colloidal particles Cp10 may be well adsorbed onto the surface of the glass particles Gp10. The colloidal particles Cp10 may be homogeneously dispersed with the glass particles Gp10. Reference numeral S30' of FIG. 3E indicates a solution S30' in which the glass powder (G10 of FIG. 3D) is added. Thereafter, as desired, centrifugation may be performed.

Figure 3F:
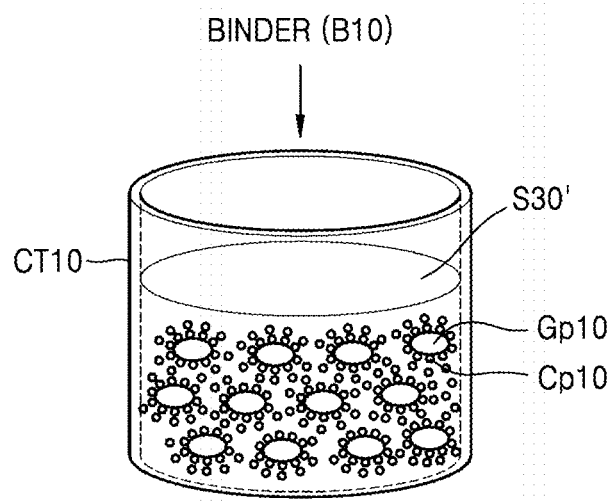

Referring to FIG. 3F, a binder B10 may be added to the solution S30'. The binder B10 may provide viscosity to the solution S30'. If the solution S30' is a water solution, the binder B10 may be a water-based binder. For example, the binder B10 may include a cellulose-based material. More specifically, the binder B10 may include hydroxypropyl cellulose (HPC), hydroxypropyl methyl cellulose (HPMC), etc. However, this is merely an example, and a material of the binder B10 may change variously. Depending on cases, the binder B10 may be a non-water-based binder. The binder B10 may include a cellulose polymer, an acrylic polymer, a styrene polymer, a polyvinyl resin, a methacrylate ester polymer, an acrylate ester polymer, a styrene-acrylate ester copolymer, a polystyrene, a polyvinyl butyral, a polyvinyl alcohol, a polyethylene oxide, a polypropylene carbonate, a polymethylmethacrylate, an ammonium acrylate, arabic gum, gelatin, an alkyd resin, a butyral resin, a saturated polyester resin, natural rubber, silicone rubber, fluorosilicone, fluoroelastomer, synthetic rubber, copolymers thereof, or a combination thereof. The amount of the binder B10 added to the solution S30' may be, for example, about 0.5 to about 5 weight percent (wt %) with respect to the solvent. If the solution S30' is a water-based solution, that is, if the solvent of the solution S30' is water, the binder B10 may be added in an amount of about 0.5 wt % to about 5 wt % with respect to the amount of water included in the solution S30'. For example, the binder B10 in an amount of about 2.5 wt %, or about 1 wt % may be added. However, this is merely an example, and the amount of the binder B10 may change variously.

After the binder B10 is added, dispersion may be further performed. When the binder B10 is added, an optional additive such as a dispersing agent, a stabilizer, etc., may be added together with the binder B10.

Figure 3G:
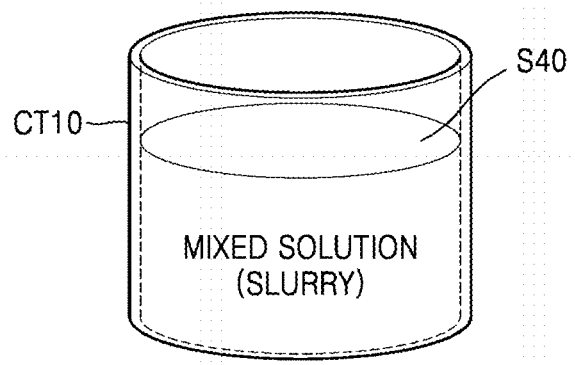

FIG. 3G shows a mixed solution S40 which is a result of the process of FIG. 3F. The mixed solution S40 may include the colloidal particles Cp10, the glass particles (i.e., the glass powder) Gp10, and the binder B10. The mixed solution S40 may be referred to as a slurry. A viscosity of the mixed solution S40 may be less than or equal to about 10,000 centipoise (cps). A composition of the mixed solution S40 may be as shown below.

TABLE 1

| Mixed Solution (Slurry) | Solvent e.g., water Colloidal Particles (metal precursor): 5-200 nm diameter e.g., Ru hydroxide [Ru(OH)3] Glass Powder: <25 μm mean particle diameter e.g., glass frit Binder: 0.5-5 wt % with respect to solvent e.g., cellulose-based material Additive (optional) |
| --- | --- |

As shown in Table 1, the mixed solution S40 may include water as a solvent, for example, and may include the colloidal particles Cp10, the glass particles (i.e., the glass powder) Gp10, and the binder B10. The colloidal particles Cp10 may be, for example, a Ru hydroxide (i.e., $Ru(OH)_3$), and may have a diameter of about 5 nm to about 200 nm. The glass powder Gp10 may be, for example, a glass frit or enamel powder, and may have a mean particle diameter of about 25 μm or less. The binder B10 may include, for example, a cellulose-based material, and the content thereof may be about 0.5 wt % to about 5 wt % with respect to the solution. The mixed solution S40 may further include at least one additive. However, the composition of the mixed solution S40 proposed herein is merely an example, and may change variously.

Figure 3H:
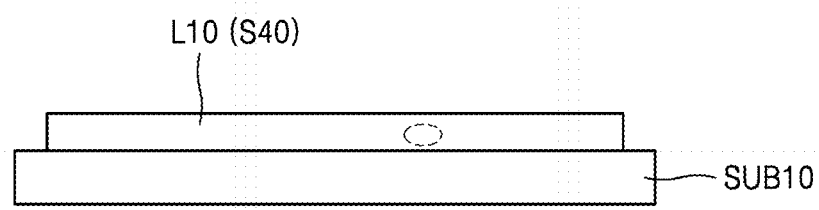

Referring to FIG. 3H, the mixed solution S40 of FIG. 3G may be applied onto a substrate SUB10 to form a film L10. The operation of applying the mixed solution S40 onto the substrate SUB10 may be performed by any one of spray coating, spin coating, dip coating, screen coating, and inkjet coating. The mixed solution S40 may be applied onto the front surface of the substrate SUB10 to form the film L10 or may be selectively applied onto a defined region of the substrate SUB10. In the latter instance, for example, after a mask film having an opening is formed on the substrate SUB10, the film L10 may be formed on the substrate through the opening defined in the mask film, and then the mask film may be removed. In this case, the film L10 may be selectively formed on the region of the substrate SUB10 corresponding to the opening. Depending on circumstances, after the film L10 is formed on the front surface of the substrate SUB10, the film L10 may be patterned into a shape before or after the film L10 is thermally processed. A method of applying and forming the film L10 may change variously.

Figure 3I:
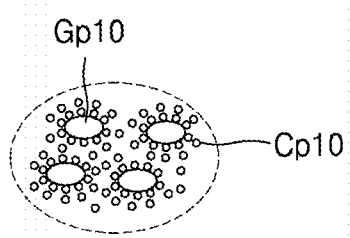

FIG. 3I is a magnified view of the dotted circle portion of the film L10 shown in FIG. 3H. In the process shown in FIGS. 3H and 3I, the film L10 may include the glass particles Gp10 and the colloidal particles Cp10 absorbed onto the surface of each of the glass particles Gp10. As shown in FIG. 3I, some of the colloidal particles Cp10, which are not directly (or closely) adsorbed onto the surface of the glass particles Gp10, may exist spaced apart from the glass particles Gp10. Although not shown in the drawings, a binder (polymer) material may exist between the glass particles Gp10.

Figure 3J:
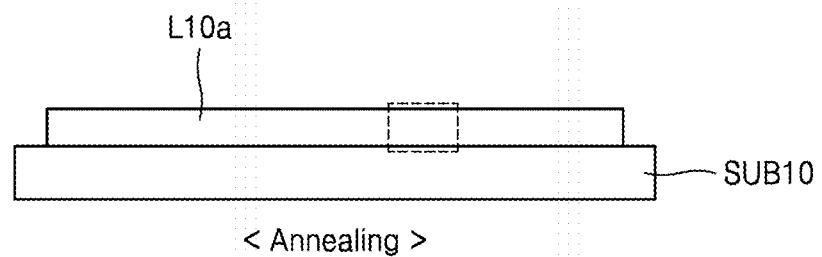
Figure 3K:
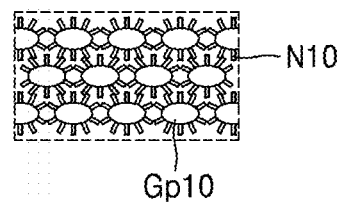

Referring to FIGS. 3J and 3K, by performing annealing with respect to the film L10, a plurality of nanostructures N10 may grow from colloidal particles Cp10 (FIG. 3H) on the surface of the glass particles Gp10. The operation of annealing the film L10 may be performed at a temperature of about 300° C. to about 500° C. The operation of annealing the film L10 may be performed for several minutes through several hours, for example, about 10 minutes to about 10 hours, or about 20 minutes to about 7.5 hours, or about 30 minutes to about 5 hours. More specifically, the annealing may be performed at a temperature of about 350° C. to about 450° C. for 30 minutes through 5 hours. The operation of annealing the film L10 may be referred to as an operation where the nanostructures N10 grow, i.e., a crystal growth operation. FIG. 3K is a magnified view of the dotted circle portion of the film L10 in FIG. 3J. The colloidal particles Cp10 (FIG. 3H) existing on the surface of the glass particles Gp10 may serve as a seed for crystal growth, and the crystal may grow from the surface of the glass particles Gp10 to form the nanostructure N10. The nanostructure N10 may have a form of nanowires, nanorods, or a form that is similar thereto, or may be a combination thereof. The plurality of nanostructures N10 formed in this way may include a metallic oxide. For example, the plurality of nanostructures N10 may include Ru oxide. In this case, the plurality of nanostructures N10 may include rutile $RuO_2$. Through the annealing process, the solvent and the organic material such as the binder, the dispersing agent, etc., in the film L10 may be mostly removed. The film having undergone the annealing is indicated by reference numeral L10a.

Figure 3L:
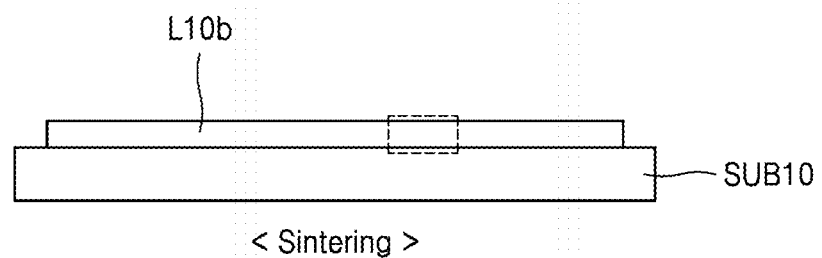
Figure 3M:

Referring to FIGS. 3K and 3M, sintering is performed with respect to the film L10a to provide the film L10b. The operation of sintering the film L10a may be performed at a temperature of about 500° C. to about 1200° C. The operation of annealing the film L10a may be performed for several minutes through several hours, for example, about 2 minutes to about 2 hours, or about 3 minutes to about 45 minutes, or about 5 minutes to about 15 minutes. More specifically, the sintering may be performed at a temperature of about 700° C. to about 800° C. for about 5 minutes to about 15 minutes. FIG. 3M is a magnified view of the dotted circle portion of the film L10 in FIG. 3L. As shown in FIG. 3M, through the sintering, a matrix material layer M10 may be formed from glass particles (Gp10 of FIG. 3I). In other words, the glass particles Gp10 (FIG. 3I) are heated to a temperature which is greater than a melting temperature of the glass particles, and thus are melted to make a continuous layer form and thus forming the matrix material layer M10. The plurality of nanostructures N10 may be dispersed in the matrix material layer M10. If any organic material such as the binder, the dispersing agent, etc., remains in the film L10a, the remaining organic material may be removed through the sintering. The film having undergone the sintering is indicated by reference numeral L10b. The sintered film L10b may correspond to the composite material structure L100 described with reference to FIG. 1.

According to the current embodiment, a plurality of nanostructures (e.g., nanowires) may be easily formed within a short time through a simple process, and a composite material structure including the plurality of nanostructures may be easily manufactured. In particular, a plurality of nanostructures may be manufactured using a wet process (solution process) without using a template formed with an anodic aluminum oxide (AAO), etc., and a composite material structure including the plurality of nanostructures may be manufactured through a continuous process, providing various advantages in terms of processing. When the nanostructure (e.g., nanowire) is formed with a metal oxide (e.g., an Ru oxide, etc.), the oxidation problem does not occur, such that sintering in the air is possible.

Figure 4:
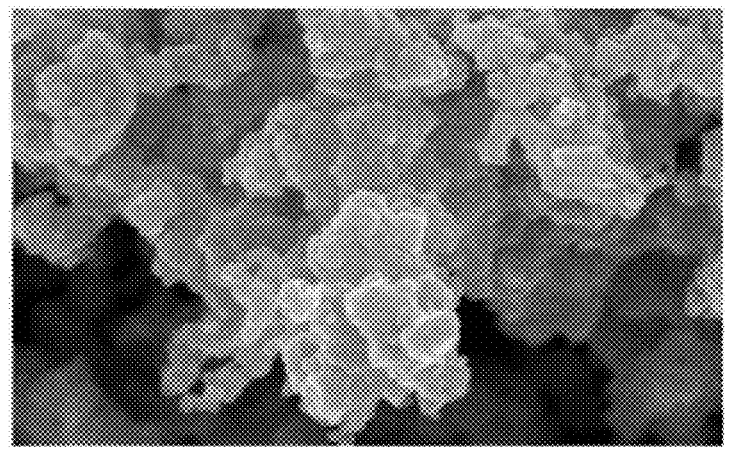
FIG. 4 shows a scanning electron microscope (SEM) image of colloidal particles used in a method of forming a composite material, according to an example embodiment.

FIG. 4 shows a scanning electron microscope (SEM) image of colloidal particles that may be used in a method of forming a composite material structure according to an embodiment; FIG. 4 illustrates an SEM image of a film which is formed by applying the solution S30 including the colloidal particles Cp10 of FIG. 3C onto the substrate and then drying the solution. In this case, the colloidal particles Cp10 are $Ru(OH)_3$.

Referring to FIG. 4, the colloidal particles may be seen. Since the solution S30 of FIG. 3C is applied and then dried, the colloidal particles may be partially agglomerated.

Figure 5:
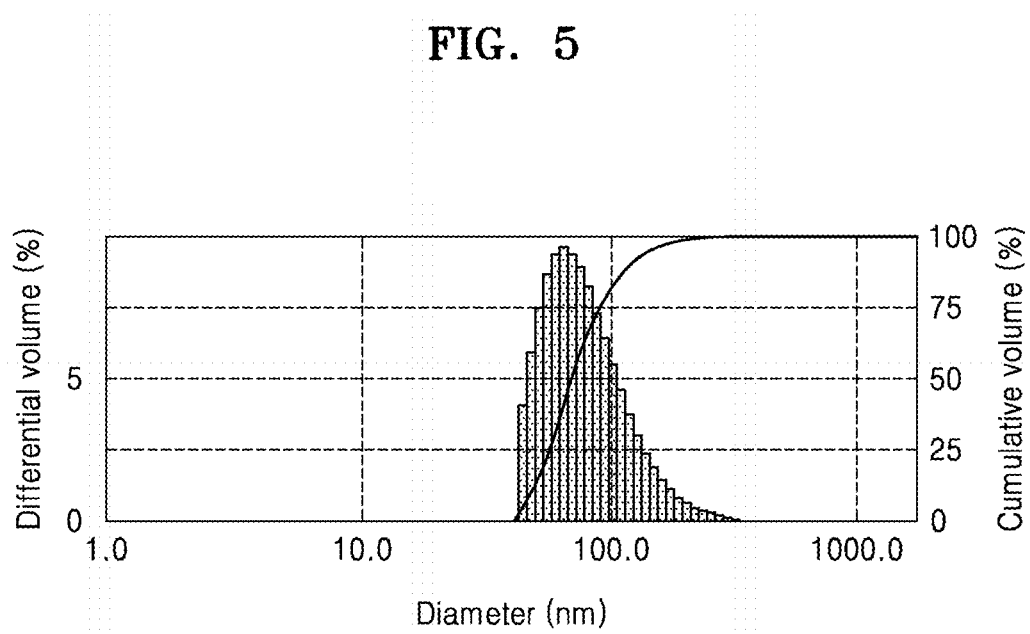
FIG. 5 is a graph of differential volume (%) versus diameter (nanometers, nm), which illustrates a size distribution of the colloidal particles used in a method of forming a composite material structure according to an example embodiment.

FIG. 5 is a graph illustrating the size distribution of the colloidal particles, which may be used in a method of forming a composite material structure according to an embodiment. In FIG. 5, the size distribution of the colloidal particles Cp10 in the solution S30 of FIG. 3C is measured.

Referring to FIG. 5, the size distribution of the colloidal particles may be seen. The mean particle diameter of the colloidal particles may be for example, about 80 nm. However, the result of FIG. 5 is merely an example, and the size distribution may vary based upon the formation conditions of the colloidal particles.

Figure 6:
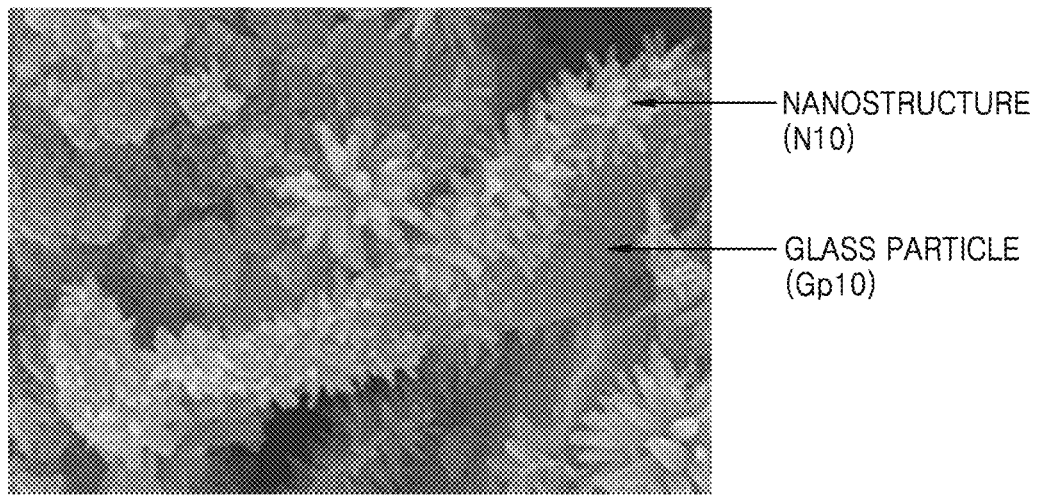
FIG. 6 is an SEM image showing a state of an annealed film L10a in FIG. 3J a method of forming a composite material according to an example embodiment.

FIG. 6 is an SEM image showing a state of the annealed film L10a of FIG. 3J in a method of forming a composite material structure according to an embodiment. In FIG. 6, the image of the annealed film L10a of FIG. 3J is captured from above a top surface of the annealed film L10a.

Referring to FIG. 6, the glass particles Gp10 of FIG. 3J and the plurality of nanostructures N10 of FIG. 3J that grow on surfaces of the glass particles.

Figure 7:
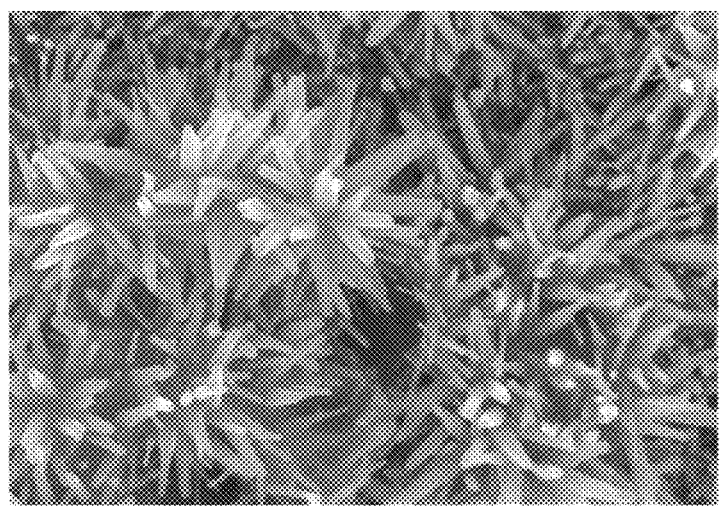
FIG. 7 is an SEM image showing a state of a sintered film in a method of forming a composite material according to an example embodiment.

FIG. 7 is an SEM image showing a state of the sintered film L10b of FIG. 3L in a method of forming a composite material structure according to an embodiment. FIG. 7 is an image of the sintered film L10b of FIG. 3L captured from above the top surface of the sintered film L10b.

Referring to FIG. 7, it may be seen that the matrix material layer M10 of FIG. 3L formed from glass particles is provided and the plurality of nanostructures N10 of FIG. 3L are provided on the matrix material layer.

Figure 8:
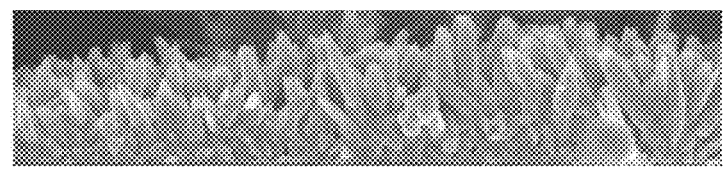
FIG. 8 is an SEM image of a surface of the film of FIG. 7, captured from a side, according to an example embodiment.

FIG. 8 is an SEM image of a surface of the film of FIG. 7, captured from a side of the film.

Referring to FIG. 8, it may be seen that the plurality of nanostructures N10 of FIG. 3L are on the surface of the film. In other words, the plurality of nanostructures N10 of FIG. 3L may protrude from a surface of the matrix material layer M10 of FIG. 3L.

Figure 9:
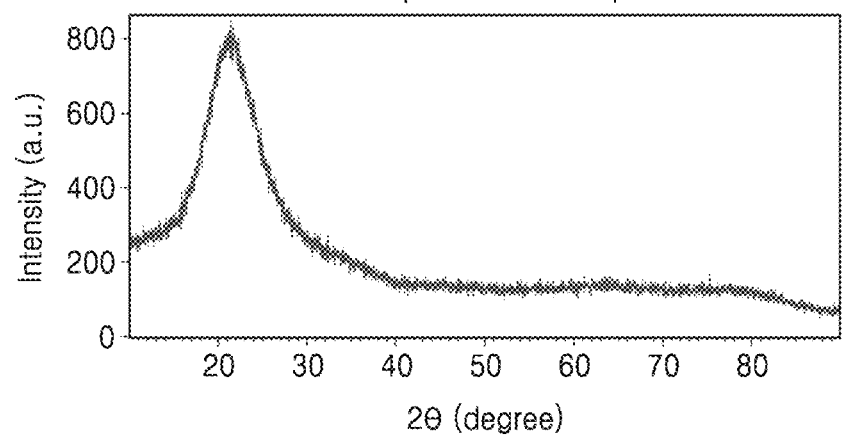
FIG. 9 is a graph of intensity (arbitrary units, a.u.) versus diffraction angle (degrees two-theta, $2\theta$), showing a result of X-ray diffraction analysis of the colloidal particles of FIG. 4, according to an example embodiment.

FIG. 9 is a graph showing a result of X-ray diffraction analysis with respect to the colloidal particles of FIG. 4.

Referring to FIG. 9, a specific peak or peaks corresponding to a crystalline structure are not present, and thus it may be seen that the colloidal particles are amorphous.

Figure 10:
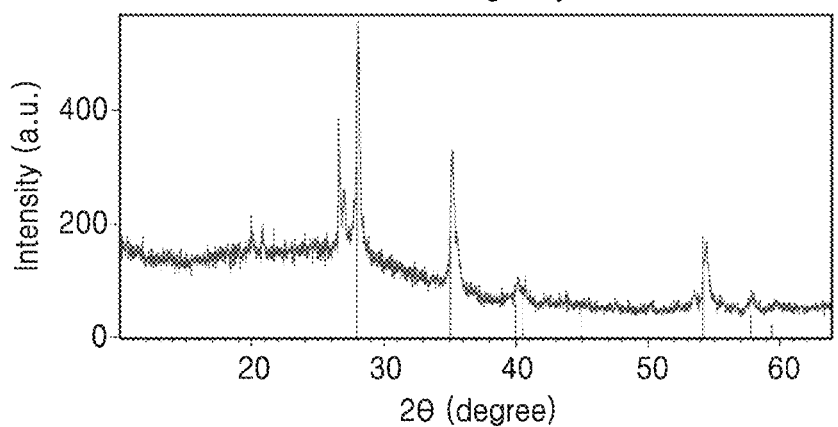
FIG. 10 is a graph of intensity (a.u.) versus diffraction angle (degrees two-theta, $2\theta$), showing a result of X-ray diffraction analysis of the nanostructures of FIG. 6, according to an example embodiment.

FIG. 10 is a graph showing a result of X-ray diffraction analysis with respect to nanostructures of FIG. 6.

Referring to FIG. 10, it may be seen that specific peaks corresponding to a crystalline structure are present. Thus, it may be seen that nanostructures growing by annealing (thermal treatment) are crystalline. Herein, the nanostructures are $RuO_2$ having a rutile crystalline structure.

Figure 11:
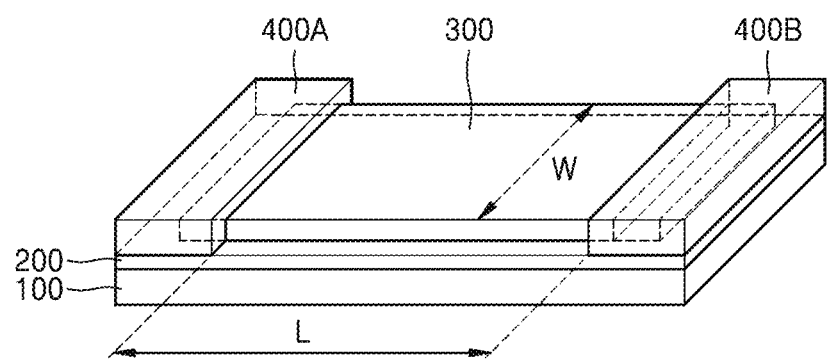
FIG. 11 is a perspective view of a structure of a device for measuring electric characteristics of a composite material layer according to an example embodiment.

FIG. 11 is a perspective view of structure of a device for measuring electric characteristics (electrical conductivity, etc.) of a composite material layer according to an embodiment.

Referring to FIG. 11, the device includes an enamel layer 200 disposed on a substrate 100, and a composite material layer 300 disposed on the enamel layer 200. A first electrode 400A contacting an end of the composite material layer 300 is disposed on the enamel layer 200, and a second electrode 400B contacting the other end of the composite material layer 300 is disposed on the enamel layer 200. The first electrode 400A covers the end of the composite material layer 300, and the second electrode 400B covers the other end of the composite material layer 300.

The substrate 100 may be, for example, a steel plate porcelain (SPP) steel plate. The enamel layer 200 may be a glass coating layer. The composite material layer 300 may correspond to the composite material structure L100 described with reference to FIG. 1. The first electrode 400A and the second electrode 400B may be metallic electrodes, e.g., Ag electrodes. Although a case where the composite material layer 300 is formed first and then the electrodes 400A and 400B are formed is shown, the electrodes 400A and 400B may be formed first and then the composite material layer 300 may be formed on the electrodes 400A and 400B.

An interval between the first electrode 400A and the second electrode 400B may be a valid (e.g., effective) length L of the composite material layer 300, and a width W of the composite material layer 300 may be defined in a direction perpendicular to the length L.

Figure 12:
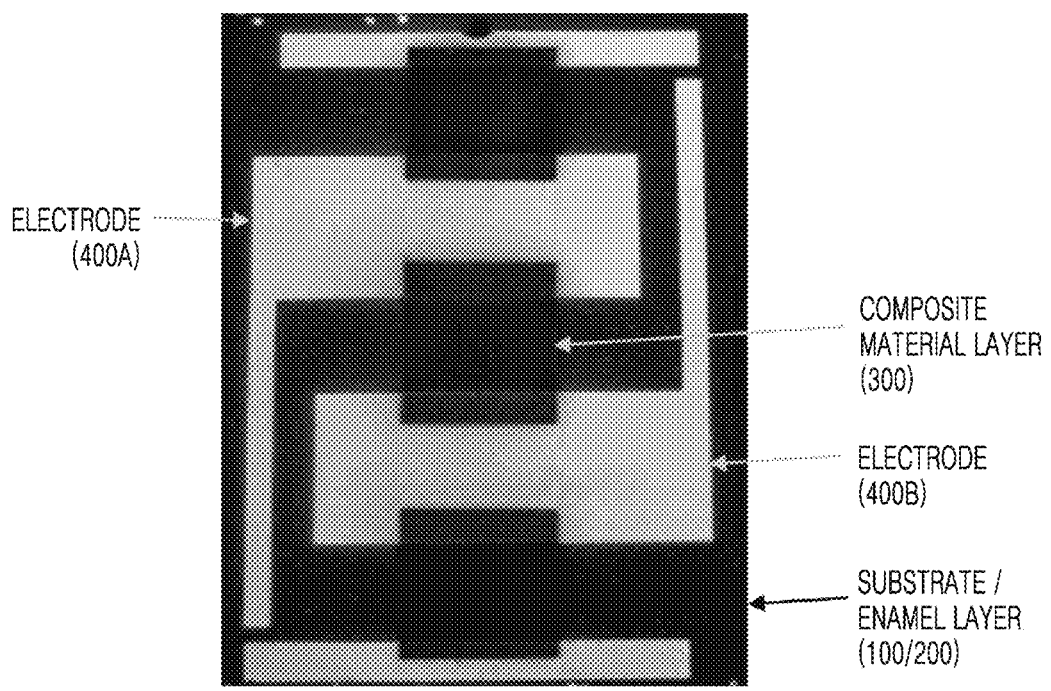
FIG. 12 is a picture showing a planar form of a structure of a device for measuring electric characteristics of a composite material layer according to another example embodiment.

FIG. 12 is a picture showing a planar form of a structure of a device for measuring electric characteristics (electrical conductivity, etc.) of a composite material layer according to another embodiment.

Referring to FIG. 12, an enamel layer 200 is provided on a substrate 100 and a plurality of electrodes 400A, 400B are provided on the enamel layer. A composite material layer 300 contacting the electrodes may be provided on the enamel layer between the plurality of electrodes.

In FIG. 12, electrical characteristics of the composite material layer are measured while changing the amount (vol %) of the plurality of nanostructures (nanowires) contained in the composite material layer. The results are shown in Table 2. In Table 2, resistance and electrical conductivity are measured at room temperature (about 25° C.). The thickness difference between samples is compensated for in the value for electrical conductivity.

TABLE 2

| | Amount of Nanostructure vol % | Dimensions of Composite Material Layer | | | Resistance Ohm | Electrical conductivity S/m |
|---|---|---|---|---|---|---|
| | | L (mm) | W (mm) | T (µm) | | |
| Sample #1 | 0.5 | 20 | 30 | 46 | 100 | 145 |
| Sample #2 | 1 | 20 | 30 | 108 | 13.8 | 447.31 |
| Sample #3 | 2.5 | 20 | 30 | 80 | 4 | 2083.33 |
| Sample #4 | 4 | 20 | 30 | 240 | 0.8 | 3472.22 |

Referring to Table 2, if a amount (volume %) of a plurality of nanostructures is 0.5 vol % (Sample #1), the electrical conductivity of the composite material layer is 145 S/m; if the amount of the plurality of nanostructures is 1 vol % (Sample #2), the electrical conductivity of the composite material layer is 447.31 S/m; if the amount of the plurality of nanostructures is 2.5 vol % (Sample #3), the electrical conductivity of the composite material layer is 2083.33 S/m; and if the amount of the plurality of nanostructures is 4 vol % (Sample #4), the electrical conductivity of a composite material layer is 3472.22 S/m. Thus, even when a small amount of nanostructure is used, for example, about 5 vol % or less, or about 1 vol % or less of nanostructure, a composite material layer having high electrical conductivity may be produced. As a volume of the nanostructure increases, a manufacturing cost of the composite material layer may also increase, such that the manufacturing cost of the composite material layer may be reduced significantly according to an embodiment of the present disclosure.

For reference, analysis results of the amounts of the enamel layer 200 described with reference to FIG. 11 and the glass material (i.e., a matrix material layer) included in the composite material layer 300 described with reference to FIG. 12, are shown in Table 3 provided below. The results shown in Table 3 have been obtained by inductively coupled plasma—atomic emission spectrometry (ICP-AES).

bismuth (Bi) oxide, a lead (Pb) oxide, or the like, or a combination thereof. The composition shown in Table 3 is merely an example, and the amounts of the enamel layer and the glass material of the matrix material layer may change variously.

Figure 13:
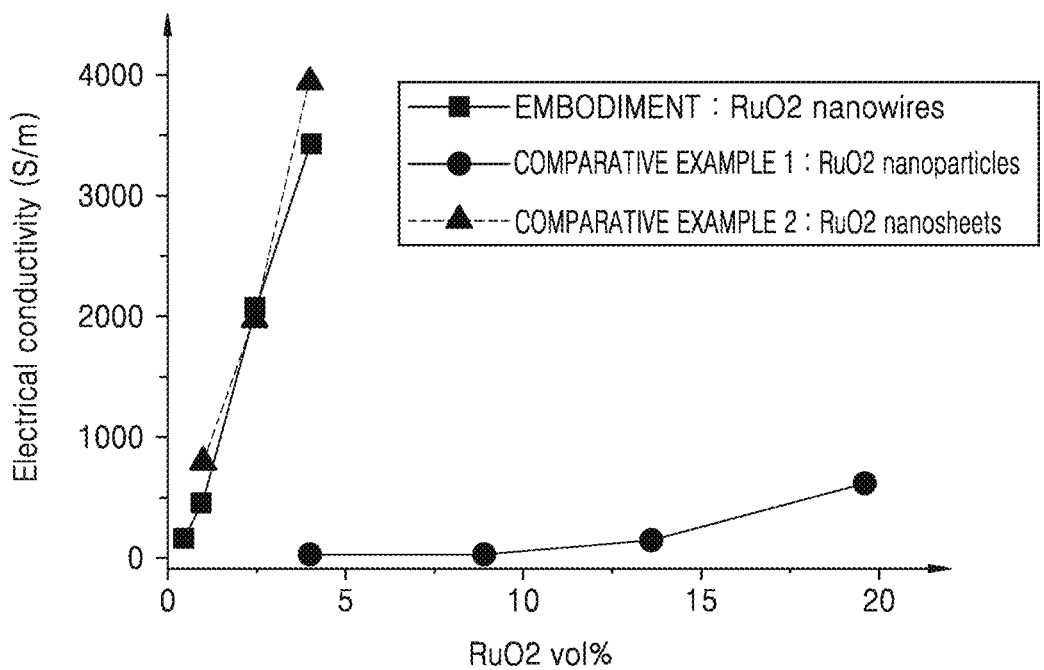
FIG. 13 is a graph of electrical conductivity (S/m) versus the amount of $RuO_2$ (vol %), showing an electrical conductivity with respect to a nanostructure content according to Example and Comparative Examples 1 and 2.

FIG. 13 is a graph showing an electrical conductivity with respect to a nanostructure content according to an Example embodiment and Comparative Examples. In FIG. 13, an Example embodiment has the structure illustrated in FIG. 1 where a plurality of nanostructures is $RuO_2$ nanowire (one-dimensional nanostructure). In FIG. 13, Comparative Example 1 has a structure in which a $RuO_2$ nanoparticle (zero-dimensional structure) is distributed in a matrix layer, and Comparative Example 2 has a structure in which a $RuO_2$ nanosheet (two-dimensional structure) is distributed in a matrix layer.

Referring to FIG. 13, the results for Comparative Example 1 show that even when an amount of $RuO_2$ nanoparticles increases, the electrical conductivity does not increase to a significant degree. In other words, to implement desired electrical conductivity using $RuO_2$ nanoparticles, a large amount of $RuO_2$ may be used. Even if a large amount of $RuO_2$ is used, high electrical conductivity may still be difficult to achieve. However, as shown by the Example, a composite material layer according to an embodiment, that is, a composite material layer including $RuO_2$ nanowires, has a high electrical conductivity even when the amount of $RuO_2$ is 5 vol % or less. That is, a small amount of $RuO_2$ may be used to obtain high levels of electrical conductivity. The amount of $RuO_2$ in the composite material layer according to an embodiment may be selected to be in a range of less than or equal to about 20 vol %. Depending on an application field, the amount of $RuO_2$ in the composite material layer may be increased to obtain high electrical conductivity (e.g., 3,000 S/m or greater), or the amount of $RuO_2$ may be reduced to lower the electrical conductivity of the composite material layer to about 5 S/m.

In FIG. 13, a result for the Example (using $RuO_2$ nanowires) is similar to a result for Comparative Example 2 (using $RuO_2$ nanosheets). That is, a result of the Example using $RuO_2$ nanowires is similar to a result of Comparative Example 2 using $RuO_2$ nanosheets. It may be seen that even if nanowires are used, a result similar to a result obtained when nanosheets are used is obtained. According to the current embodiment, a nanowire may be easily formed within a short time through a simple process, and a composite material structure including the plurality of nanostructures may be easily manufactured. Meanwhile, the process for manufacturing the nanosheets used in Comparative

TABLE 3

| | Glass material composition ratio (wt %) | | | | | | | | | | | |
|---|---|---|---|---|---|---|---|---|---|---|---|---|
| | $Li_2O$ | $B_2O_3$ | $Na_2O$ | $K_2O$ | $Al_2O_3$ | $TiO_2$ | MnO | CoO | NiO | CuO | $ZrO_2$ | $SiO_2$ |
| Enamel Layer | 1.3 | 13.5 | 11.9 | 2.0 | 2.3 | 1.7 | 0.03 | 0.53 | 0.95 | 0.24 | 1.40 | 48.9 |
| Glass material of Matrix Material Layer | 2.0 | 14.4 | 11.6 | 0.33 | 1.4 | 2.2 | 0.1 | 0.7 | 2.7 | 0.4 | 0.1 | 49.8 |

The values in Table 3 reflect the amounts of the enamel layer 200 and the glass material of the matrix material layer 300, and each of the enamel layer and the matrix material layer may further include materials other than those indicated in Table 3. For example, the enamel layer 200 and the glass material of the matrix material layer 300 may further include a phosphorous (P) oxide, a zinc (Zn) oxide, a Example 2 is more difficult and takes a longer period of time compared to the nanowires used in the Example. On the other hand, the nanowire and the composite material layer including the same according to the Example may be easily manufactured within a short time using a solution process. In particular, according to an embodiment of the present disclosure, a plurality of nanowires may be manufactured using a wet process (the solution process) without using a template formed with an AAO, etc., and thus a composite material layer including the plurality of nanostructures may be manufactured through a continuous process, providing various advantages in terms of processing.

Figure 14:
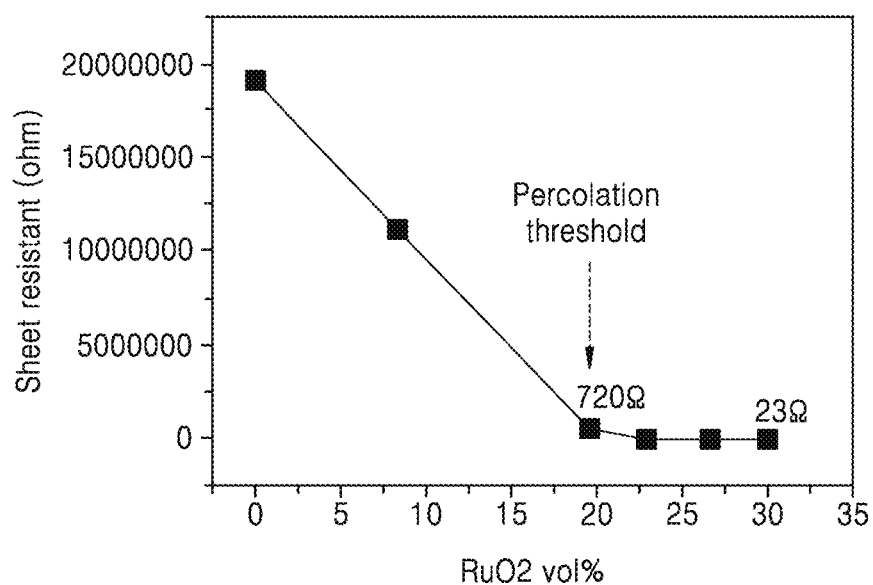
FIG. 14 is a graph of sheet resistance (ohms) versus the amount of $RuO_2$ (vol %), showing results of measuring a sheet resistance with respect to a volume of nanostructures in a material layer according to a Comparative Example 1.

FIG. 14 is a graph showing a result of measuring a sheet resistance with respect to Comparative Example 1, as previously described with reference to FIG. 13. That is, FIG. 14 shows a result regarding a structure where a $RuO_2$ nanoparticles are distributed in a matrix material layer (glass).

Referring to FIG. 14, it may be seen that when the amount of $RuO_2$, that is, the amount of $RuO_2$ nanoparticles is greater than or equal to about 20 vol %, the sheet resistance levels off at a relatively low value. Thus, when a material layer according to the Comparative Example 1 is used, about 20 vol % or more of $RuO_2$ is used to achieve a desired low level of sheet resistance and high electrical conductivity. Without being limited by theory, it is believed that the material layer according to the Comparative Example 1 may have a high percolation threshold. In this case, a large amount of $RuO_2$ is used, thereby increasing a manufacturing cost. Since $RuO_2$ is a high-cost material, the overall manufacturing cost may increase significantly as the percolation threshold increases.

In FIG. 14, when the amount of $RuO_2$ is 20 vol %, a surface resistance is 720 ohms ($\Omega$), and when the amount of $RuO_2$ is 30 vol %, the surface resistance is 23 $\Omega$. For 20 vol % of $RuO_2$, an electrical conductivity is less than about 500 S/m. Herein, both a surface resistance and an electrical conductivity are measured at room temperature.

Without being limited by theory, it is believed that for the composite material layer according to the Example of the present disclosure, the percolation threshold is much lower than the percolation threshold of the material layer according to the Comparative Example 1, such that even if the amount of nanostructure (e.g., nanowire) is significantly reduced, high levels of electrical conductivity may be obtained. In this regard, a manufacturing cost of the composite material layer may be reduced significantly. Moreover, the composite material layer having superior performance may be easily implemented.

Figure 15:
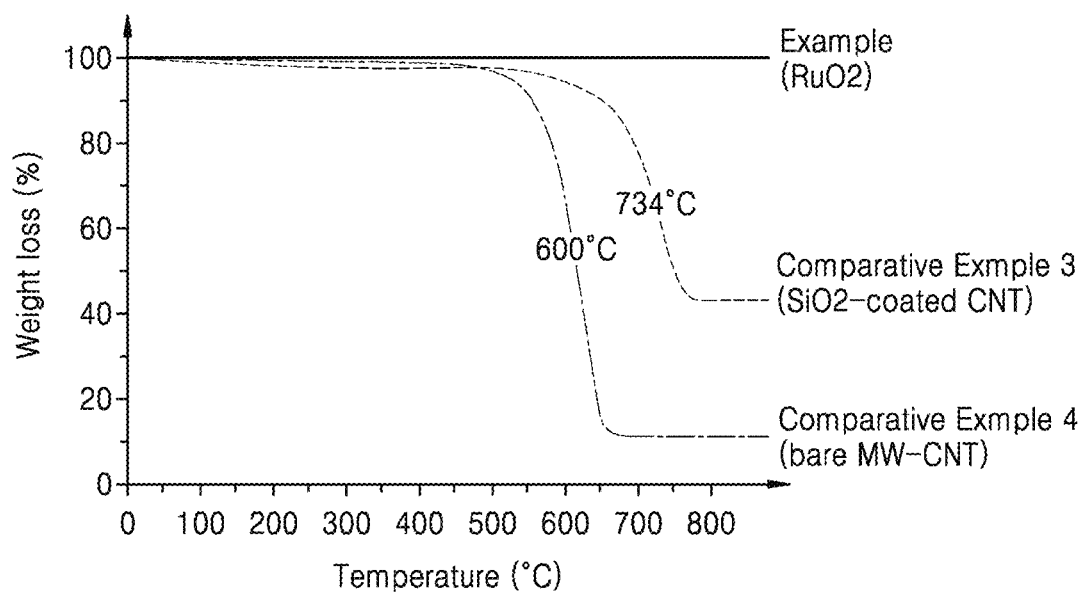
FIG. 15 is a graph of weight loss (%) versus temperature (° C.), showing results of measuring weight loss with respect to a temperature of a nanostructure material according to Example and a temperature of a nanostructure material according to Comparative Examples 3 and 4.

FIG. 15 is a graph showing the percentage of weight loss with respect to a temperature for a nanostructure material of an Example and of Comparative Examples 3 and 4. A nanostructure material according to the Example is $RuO_2$, and the nanostructure material according to Comparative Example 3 is an $SiO_2$-coated carbon nanotube (CNT) and the nanostructure material according to Comparative Example 4 is a bare MW-CNT. The $SiO_2$-coated carbon nanotube (CNT) means a CNT onto which an $SiO_2$ layer is coated, and the bare MW-CNT means a non-coated multi-walled CNT.

Referring to FIG. 15, the $SiO_2$-coated CNT (Comparative Example 3) and the bare MW-CNT (Comparative Example 4) have a high weight loss at a temperature of about 600° C. or higher, whereas $RuO_2$ according to the Example embodiment does not have a weight loss even at a high temperature of about 800° C. or higher. This means that $RuO_2$ has superior oxidation resistance. Moreover, $RuO_2$ may have high electrical conductivity, e.g., a high electrical conductivity of about $2\times10^6$ S/m. In addition, a CNT may not be useful to synthesize a composite structure through high-temperature processing due to thermal degradation of the CNT at a temperature of about 400° C. or higher, and thus may be difficult to apply to a device exposed to high temperature due to changes in the electrical and physical properties of the device which may occur at high temperatures. However, when a nanostructure according to an Example embodiment is used, superior oxidation resistance and stability/durability may be obtained, thereby overcoming the disadvantages of the CNT.

The composite material structure (composite material layer) according to the embodiments described above may be applied to various elements and devices. The composite material structure (composite material layer) according to the embodiments may be used as a heating element for a heating device or a resistor in a semiconductor device field, or may be used as a sensor layer for various purposes. For example, the composite material structure (composite material layer) may be used as a heating element (e.g., a planar-type heating element or a surface-type heating element) of a heating apparatus, such as an electric oven. The composite material structure (composite material layer) may be applied as a 'thick film resistor' in devices within the semiconductor device field. For example, the thick film resistor may be used as a chip resistor, a hybrid integrated circuit (IC), a network resistor, etc. The composite material structure (composite material layer) may also be used as a thermistor device. The composite material structure (composite material layer) may be used as a sensor layer of a touch sensor, a sensor layer of a gas sensor, or the like. The composite material structure (composite material layer) may also be used in a device for a microprocessor of a computer, a chemical sensor, or the like. The composite material structure (composite material layer) may also be used in medical equipment, e.g., an ultrasonic device, an X-ray device, a magnetic resonance imaging (MRI) device, etc. The composite material structure (composite material layer) according to the embodiments described above may be also applied to various other types of devices and apparatuses.

Hereinbelow, a device/apparatus including the composite material structure (composite material layer) according to the embodiments will be described.

Figure 16:
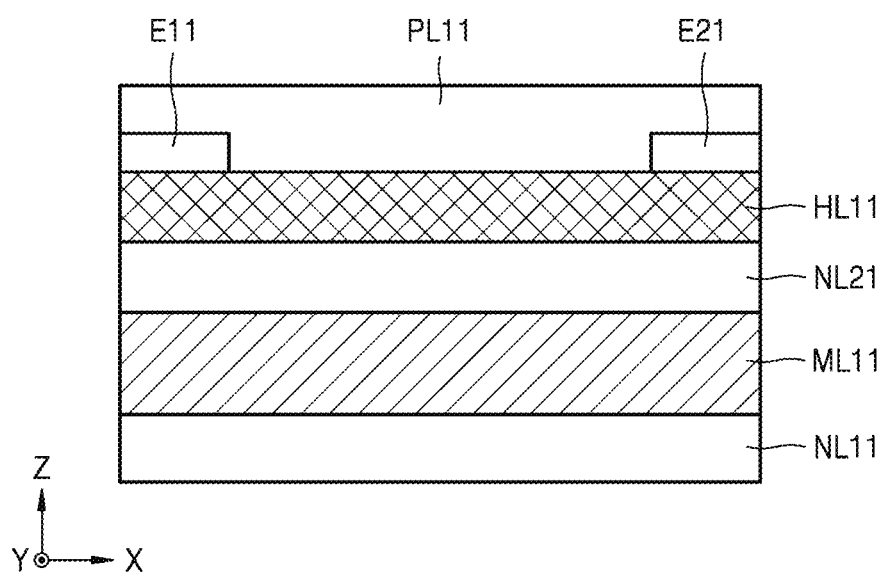
FIG. 16 is a cross-sectional view of a heating device including a layer of a composite material according to an example embodiment.

FIG. 16 is a cross-sectional view of a heating device including a composite material layer according to an embodiment as a heating element. A heating device according to the current embodiment may be a planar-type heating device or surface-type heating device.

Referring to FIG. 16, a first insulating layer N11 may be provided on a surface (e.g., a bottom surface) of a metal layer ML11, and a second insulating layer NL21 may be provided on the other surface (e.g., a top surface) of the metal layer ML11. The metal layer ML11 may be, for example, an SPP steel plate, but may be changed as desired without being limited to this example. At least one of a first insulating layer N11 and a second insulating layer N21 may be, for example, an enamel layer, but may be changed as desired without being limited to this example. The first insulating layer N11 and the second insulating layer N21 may be formed of the same material (e.g., enamel) or may be formed of different materials . The first insulating layer N11 may or may not be present in the heating device.

A heating element (e.g., heating layer) HL11 may be provided on the second insulating layer N21. Thus, the second insulating layer N21 may be disposed between the metal layer ML11 and the heating element HL11. The heating element HL11 may be the composite material structure according to embodiments described herein, for example, the structure illustrated in FIG. 1. In other words, the heating element HL11 may include a matrix material layer including a glass material and a plurality of nanostructures distributed in the matrix material layer. The electrical conductivity of the plurality of nanostructures may be higher than the electrical conductivity of the matrix material layer, and the nanostructure includes a first nanostructure and a second nanostructure which may contact each other. The plurality of nanostructures may be, for example, a nanowire, and may include a metal oxide (e.g., rutile $RuO_2$). The heating element HL11 may be in the form of a thick film. A thickness of the heating layer HL11 may be greater than or equal to about 1 µm. The heating element HL11 may be referred to as a "planar heating element."

The heating device may include a first electrode E11 connected to/in contact with a first region of the heating element HL11, and a second electrode E21 connected to/in contact with a second region of the heating layer HL11. For example, the first electrode E11 and the second electrode E21 may be disposed to be connected to a first end and a second opposite end of the heating element HL11, respectively. Although the first electrode E11 and the second electrode E21 are illustrated as being in contact with the top surface of the heating layer HL11, alternatively, the first electrode E11 and the second electrode E21 may contact the bottom surface of the heating layer HL11. An electric signal may be applied to the heating element HL11 through the first electrode E11 and the second electrode E21, and thus, thermal energy may be generated in the heating element HL11.

A protective layer PL11 may be further disposed on the heating layer HL11 in a manner to cover the heating layer HL11. The protective layer PL11 may be disposed to cover the first electrode E11, the second electrode E21, and the exposed portions of the heating element HL11 between the first electrode E11 and the second electrode E21. The protective layer PL11 may be formed of an insulating material.

The structure of the heating device shown in FIG. 16 is an example, and a structure of a device including a heating element may be changed as desired. The heating element HL11 according to an embodiment may be applied to existing various heating devices. The heating element HL11 may have excellent oxidation resistance, high-temperature stability, and controlled (high) electrical conductivity, and in this sense, a high-performance heating device (heating apparatus) may be implemented. For example, the heating element HL11 may be suitable for implementing a pyrolytic self-cleaning function of an electric oven.

According to an embodiment of the present disclosure, there is provided an apparatus including a heating element that includes the above-described composite material structure. Moreover, there is provided a method of manufacturing an apparatus, the method including forming a heating element and forming an electrode structure electrically connected to the heating element, in which the forming of the heating element includes forming a composite material structure using the above-described method.

Figure 17:
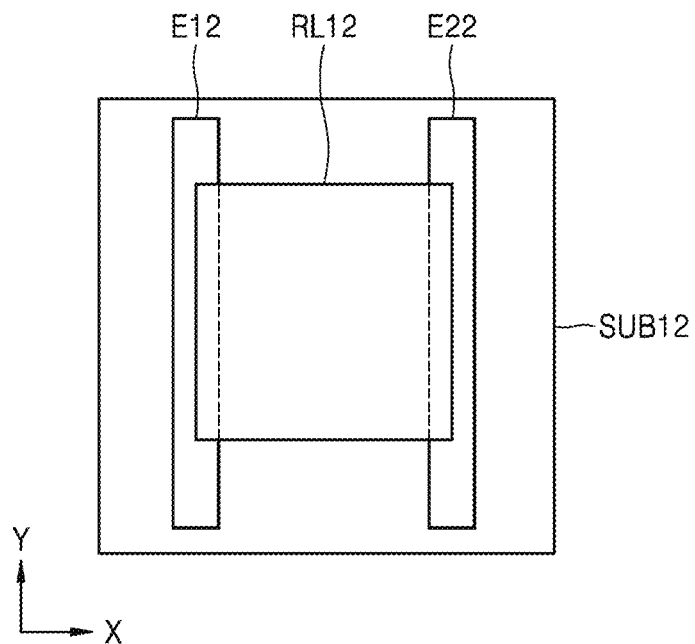
FIG. 17 is a plane view of a thermistor device including a layer of a composite material according to an example embodiment.

FIG. 17 is a plane view of a thermistor device to which a composite material structure according to an embodiment is applied. In the current embodiment, the thermistor device may be referred to as a thermal variable resistor or a thermal variable resistor device.

Referring to FIG. 17, a first electrode E12 and a second electrode E22 may be disposed on a substrate SUB12 spaced apart from each other. The substrate SUB12 may be an insulating substrate. For example, the substrate SUB12 may include an insulating material such as alumina or any other suitable insulating material. The first electrode E12 and the second electrode E22 may include a metal or a metallic material, e.g., Ag, but may be changed as desired without being limited to this example.

A variable resistor layer RL12 connected to (in contact with) the first electrode E12 and the second electrode E22 may be provided on the substrate SUB12. The variable resistor layer RL12 may be a layer having an electrical resistance that changes with temperature. The variable resistor layer RL12 may have a composite material structure according to embodiments, for example, the structure illustrated in FIG. 1. The resistance of the variable resistor layer RL12 may change with temperature, and as a result, the intensity of current flowing through the first electrode E12 and the second electrode E22 may change. If the variable resistor layer RL12 includes an Ru oxide, a temperature coefficient of resistance (TCR) of the Ru oxide may be close to 0 and may have a resistance value having a wide range, thereby providing a thermistor device with superior performance. The structure of the thermistor device illustrated in FIG. 17 is an example, and may be changed variously.

Figure 18:
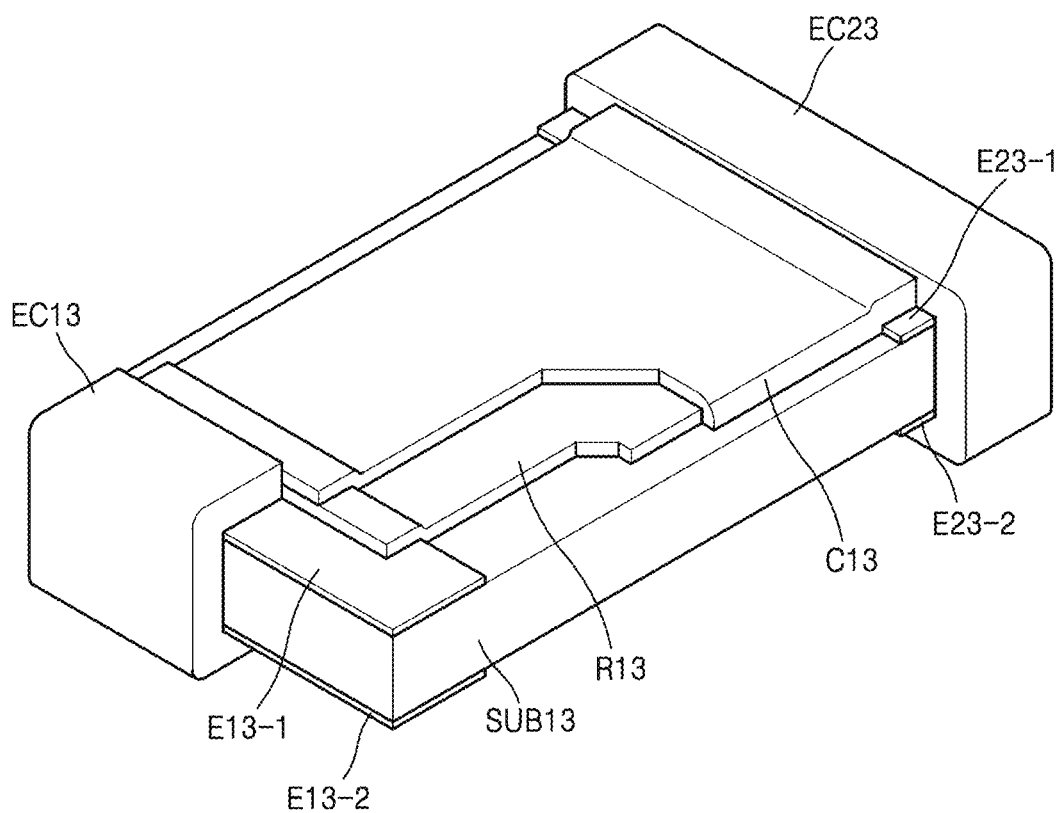
FIG. 18 is a perspective view of a semiconductor device including a layer of a composite material according to an example embodiment.

FIG. 18 is a perspective view of a semiconductor device to which a composite material structure according to an embodiment is applied. The semiconductor device according to the current embodiment may be a chip resistor device.

Referring to FIG. 18, a first upper electrode E13-1 may be disposed on a top surface of an insulating substrate SUB13. A first lower electrode E13-2 corresponding to the first upper electrode E13-1 may be disposed on a bottom surface of the insulating substrate SUB13. The first upper electrode E13-1 and the first lower electrode E13-2 may be disposed on top and bottom surfaces of a first end portion of the insulating substrate SUB13. A second upper electrode E13-1 and a second lower electrode E23-2 may be disposed on top and bottom surfaces of a second end portion of the insulating substrate SUB13. A pair of electrodes E13-1 and E13-2 may be disposed in the first end portion of the insulating substrate SUB13, and similarly, a pair of electrodes E23-1 and E23-2 may be provided in the second end portion of the insulating substrate SUB13.

A resistor R13 may be provided on a surface of the insulating substrate SUB13. The resistor R13 may be electrically connected (e.g., in electrical contact) with the first upper electrode E13-1 and the second upper electrode E23-1 on the top surface of the insulating substrate SUB13. An end of the resistor R13 may be electrically connected to the first upper electrode E13-1, and the other end of the resistor R13 may be electrically connected to the second upper electrode E23-1. The resistor R13 may have a composite material structure according to embodiments, for example, the structure illustrated in FIG. 1. The resistor R13 may be a "thick film resistor."

A cover layer C13 covering the resistor R 13 may be further provided. The cover layer C 13 may be a protective layer or a coating layer. The cover layer C13 may be formed of an insulating material.

A first end cap EC13 may be provided in the first end portion of the insulating substrate SUB13, and a second end cap EC23 may be provided in the second end portion of the insulating substrate SUB13. The first end cap EC13 may be disposed to enclose (cap) the first end portion of the insulating substrate SUB13 while contacting the first upper electrode E13-1 and the first lower electrode E13-2. Likewise, the second end cap EC23 may be disposed to enclose (cap) the second end portion of the insulating substrate SUB13 while contacting the second upper electrode E23-1 and the second lower electrode E23-2.

The structure illustrated in FIG. 18 is an example, and a structure of a semiconductor device (chip resistor device) may be changed variously. For example, a bonding structure between the resistor RL13 and the cover layer C13, and the first end cap EC13 may be changed variously. Likewise, a bonding structure between the resistor RL13 and the cover layer C13, and the second end cap EC23 may be changed variously. Forms of the resistor RL13 and the cover layer C13 may also be changed variously. The configuration of the resistor RL13 may correspond to the composite material of FIG. 1, and the other configuration may be changed variously.

Figure 19:
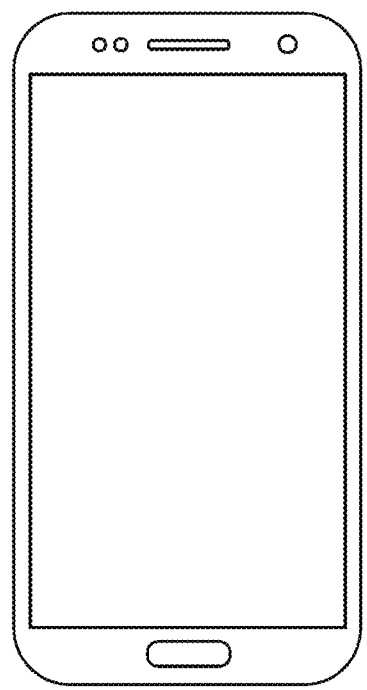
FIG. 19 is an illustration of an apparatus including a touch sensor including a layer of a composite material according to an example embodiment.

FIG. 19 illustrates an apparatus including a touch sensor to which a composite material structure (composite material layer) according to an embodiment is applied. An apparatus according to the current embodiment may be a mobile phone, and the mobile phone may be a smart phone.

Referring to FIG. 19, a touch sensor of a touch screen of the mobile phone may include a composite material structure according to embodiments of the present disclosure. For example, the touch sensor may include the composite material structure illustrated in FIG. 1. The composite material structure according to an embodiment of the present disclosure may be applied as a touch sensor layer and may, for example, replace an indium tin oxide (ITO) sensor layer. The composite material structure according to an embodiment may be mass-produced easily through a wet process or solution process, thereby reducing the manufacturing cost of the touch screen. Moreover, a superior-performance touch screen may be provided.

Although a touch sensor applied to a mobile phone (smart phone) is illustrated in FIG. 19, the touch sensor may be applied to various other types of apparatuses other than the mobile phone. The composite material structure according to embodiments of the present disclosure may be applied to any field in which a touch sensor is used.

Figure 20:
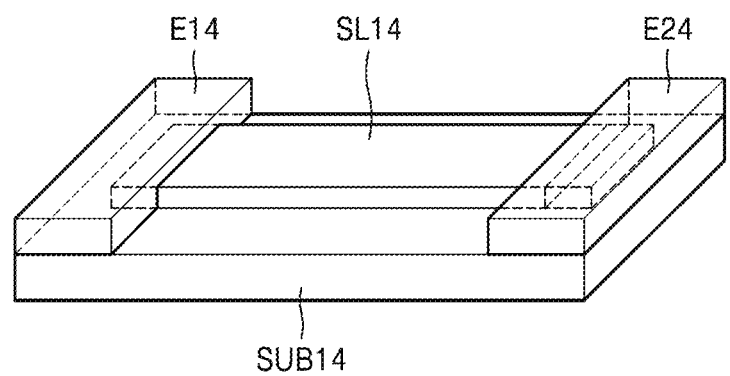
FIG. 20 is a perspective view of a gas sensor including a layer of a composite material according to an example embodiment.

FIG. 20 is a perspective view of a gas sensor to which a composite material structure according to an embodiment is applied.

Referring to FIG. 20, a gas sensor layer SL14 may be provided on a substrate SUB14. A first electrode E14 connected to/contacting a first region of the gas sensor layer SL14 may be disposed at an end of the a gas sensor layer SL14, and a second electrode E24 connected to/contacting a second region of the gas sensor layer SL14 may be disposed at an opposite end of the a gas sensor layer SL14. The gas sensor layer SL14 may include a composite material structure according to embodiments of the present disclosure. For example, the gas sensor layer SL14 may have the composite material structure illustrated in FIG. 1. As gas molecules are adsorbed onto the gas sensor layer SL14, the intensity of current flowing through the first electrode E14 and the second electrode E24 may change. Thus, a device illustrated in FIG. 20 may be capable of sensing (e.g. detecting) the presence of a gas. The types of gas sensed by the device may include, for example, $NH_3$, $NO_2$, $H_2$, $CH_4$, and the like. Although the gas sensor is simply illustrated in FIG. 20, this is merely an example, and a structure thereof may be changed variously. A circuit (not shown) connected to the gas sensor may be further provided.

In the above-described embodiments, a description has been made of a case where a metal oxide, e.g., $RuO_2$, is used as the nanostructure (nanowire) material of the composite material structure (composite material layer), but materials other than $RuO_2$ may be used. For example, as a nanostructure (nanowire) material, an oxide such as $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, $RhO_2$, etc., a boride such as $Ta_3B_4$, $Nb_3B_4$, $TaB$, $NbB$, $V_3B_4$, $VB$, etc., or a chalcogenide-based material may be used. A combination of the foregoing materials may also be used. In addition, a matrix material layer of a composite material structure (composite material layer) may include other inorganic materials instead of a glass material. Moreover, in the above-described embodiments, a case where the composite material structure is in the form of a film is mainly illustrated and described, but the composite material structure may also have an alternative structure, such as a rod form, instead of a film form.

While various details have been described above, they should be interpreted as providing examples of embodiments rather than limiting the scope of the embodiments. For example, those of ordinary skill in the art may recognize that the composite material structure and the method of forming the same described with reference to FIGS. 1, 2, and 3A through 3M may be changed variously. The structures of the device/apparatus described with reference to FIGS. 16 through 20 may also be changed variously. The composite material structure according to the embodiments may be applied to fields other than the fields described with reference to FIGS. 16 through 20. Therefore, the scope of the embodiments should be defined by the technical spirit of the claims rather than by the described embodiments.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite material structure comprising:
   a matrix material layer comprising a glass material; and
   a plurality of one-dimensional nanostructures distributed in the matrix material layer and having an electrical conductivity greater than an electrical conductivity of the matrix material layer,
   wherein the plurality of one-dimensional nanostructures comprises a first one-dimensional nanostructure and a second one-dimensional nanostructure in contact with each other,
   wherein the plurality of one-dimensional nanostructures comprises a metal oxide in a form of a nanowire, a nanorod, or a combination thereof,
   wherein at least a portion of the plurality of one-dimensional nanostructures protrudes from a surface of the glass material, and
   wherein an amount of the plurality of one-dimensional nanostructures in the composite material is less than or equal to 5 volume percent, based on a total volume of the composite material.

2. The composite material structure of claim 1, wherein the plurality of one-dimensional nanostructures has an aspect ratio of about 2 or higher.

3. The composite material structure of claim 1, wherein the plurality of one-dimensional nanostructures has a diameter of about 5 nanometers to about 300 nanometers and a length of about 500 nanometers to about 20 micrometers.

4. The composite material structure of claim 1, wherein at least a portion of the plurality of one-dimensional nanostructures protrudes from a surface of the matrix material layer.

5. The composite material structure of claim 1, wherein the plurality of one-dimensional nanostructures comprises $RuO_2$.

6. The composite material structure of claim 1, wherein the plurality of one-dimensional nanostructures comprises a rutile crystalline structure.

7. The composite material structure of claim 1, wherein the glass material comprises a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, a sodium oxide, or a combination thereof.

8. The composite material structure of claim 1, wherein an amount of the plurality of one-dimensional nanostructures in the composite material is less than or equal to about 2.5 volume percent, based on a total volume of the composite material.

9. The composite material structure of claim 1, wherein the composite material has an electrical conductivity of about 5 Siemens per meter or greater at room temperature.

10. The composite material structure of claim 1, wherein the composite material structure is a heating element.

11. The composite material structure of claim 1, wherein the composite material structure is a resistor.

12. An apparatus comprising a heating element, wherein the heating element comprises a composite material structure, the composite material structure comprising:
a matrix material layer comprising a glass material; and
a plurality of one-dimensional nanostructures distributed in the matrix material layer and having an electrical conductivity greater than an electrical conductivity of the matrix material layer,
wherein the plurality of one-dimensional nanostructures comprises a first one-dimensional nanostructure and a second one-dimensional nanostructure in contact with each other,
wherein the plurality of one-dimensional nanostructures comprises a metal oxide in a form of a nanowire, a nanorod, or a combination thereof,
wherein at least a portion of the plurality of one-dimensional nanostructures protrudes from a surface of the glass material, and
wherein an amount of the plurality of one-dimensional nanostructures in the composite material is less than or equal to 5 volume percent, based on a total volume of the composite material.

13. A method of forming a composite material structure, the method comprising:
providing a solution comprising a plurality of colloidal particles comprising a metal element;
adding a glass powder to the solution to form a solution comprising the plurality of colloidal particles and the glass powder;
adding a binder to the solution comprising the plurality of colloidal particles and the glass powder to form a mixed solution comprising the plurality of colloidal particles, the glass powder, and the binder;
forming a film by applying the mixed solution containing the plurality of colloidal particles, the glass powder, and the binder onto a substrate; and
forming a plurality of one-dimensional nanostructures from the plurality of colloidal particles and forming a matrix material layer from the glass powder by performing a thermal treatment process on the film to prepare the composite material structure, wherein the plurality of one-dimensional nanostructures is formed in the matrix material layer,
wherein the plurality of one-dimensional nanostructures comprises a metal oxide in a form of a nanowire, a nanorod, or a combination thereof,
wherein at least a portion of the plurality of one-dimensional nanostructures protrudes from a surface of the glass material, and
wherein an amount of the plurality of one-dimensional nanostructures in the composite material is less than or equal to 5 volume percent, based on a total volume of the composite material.

14. The method of claim 13, wherein the thermal treatment process comprises:
annealing the film; and
sintering the film,
wherein in the annealing of the film, the plurality of one-dimensional nanostructure is formed from at least a portion of the plurality of the colloidal particles on a surface of the glass powder, and
wherein in the sintering of the film, the matrix material layer is formed from the glass powder.

15. The method of claim 14, wherein the annealing of the film is performed at a temperature of about 300° C. to about 500° C.

16. The method of claim 14, wherein the sintering of the film is performed at a temperature of about 500° C. to about 1200° C.

17. The method of claim 13, wherein the providing of the solution comprising the plurality of colloidal particles comprising the metal element comprises:
dissolving a metal precursor in an acid solution; and
forming the plurality of the colloidal particles from the metal precursor by adding a basic solution to the acid solution.

18. The method of claim 13, wherein the plurality of the colloidal particles is amorphous, and the plurality of one-dimensional nanostructures are crystalline.

19. The method of claim 13, wherein the plurality of one-dimensional nanostructures comprises a nanowire, a nanorod, or a combination thereof.

20. The method of claim 13, wherein the plurality of one-dimensional nanostructures comprises a metal oxide.

21. The method of claim 13, wherein the plurality of one-dimensional nanostructures comprises rutile $RuO_2$.

22. A method of manufacturing an apparatus, the method comprising:
forming a heating element; and
forming an electrode structure electrically connected to the heating element,
wherein the forming of the heating element comprises forming a composite material structure using the method of claim 13.

23. The composite material structure of claim 1, wherein the glass material comprises glass particles or an enamel powder, and wherein the plurality of one-dimensional nanostructures protrude from a surface of the glass particles or the enamel powder.

* * * * *